(12) United States Patent
Powers et al.

(10) Patent No.: US 8,286,834 B2
(45) Date of Patent: Oct. 16, 2012

(54) SKIN TREATMENT DISPENSER AND METHOD OF MANUFACTURE

(76) Inventors: Jeffrey Lewis Powers, Plymouth, MI (US); Dennis Willard Davis, Eustis, FL (US); David Paul Thimm, Plymouth, MI (US); James Marvin Stenz, Fenton, MI (US)

( * ) Notice: Subject to any disclaimer, the term of this patent is extended or adjusted under 35 U.S.C. 154(b) by 1171 days.

(21) Appl. No.: 12/006,511

(22) Filed: Jan. 3, 2008

(65) Prior Publication Data

US 2010/0314414 A9 Dec. 16, 2010

Related U.S. Application Data

(63) Continuation-in-part of application No. 11/520,962, filed on Sep. 14, 2006, and a continuation-in-part of application No. 10/915,720, filed on Aug. 10, 2004, now Pat. No. 7,316,332, which is a continuation-in-part of application No. 10/729,757, filed on Dec. 5, 2003, now Pat. No. 7,135,011, which is a continuation-in-part of application No. 10/314,825, filed on Dec. 9, 2002, now abandoned.

(60) Provisional application No. 60/716,844, filed on Sep. 14, 2005.

(51) Int. Cl.
*B67D 7/84* (2010.01)

(52) U.S. Cl. ........ 222/175; 222/192; 222/212; 222/213; 222/490; 222/491; 222/494; 224/148.6; 604/310

(58) Field of Classification Search .................. 222/206, 222/209, 213–215, 490–491, 494, 192, 175, 222/212; 604/309–311, 289; 224/148.2, 224/148.6, 148.1, 148.4

See application file for complete search history.

(56) References Cited

U.S. PATENT DOCUMENTS

| | | | | |
|---|---|---|---|---|
| 2,235,350 A | * | 3/1941 | Anderson | 224/148.7 |
| 3,814,288 A | * | 6/1974 | Westrich | 222/129 |
| 3,845,770 A | | 11/1974 | Theeuwes et al. | |
| 4,241,850 A | | 12/1980 | Speer et al. | |
| 4,728,006 A | * | 3/1988 | Drobish et al. | 222/181.3 |
| 4,768,688 A | | 9/1988 | Harrigan | |
| 5,088,624 A | | 2/1992 | Hackett et al. | |
| 5,339,995 A | | 8/1994 | Brown et al. | |
| 5,409,144 A | | 4/1995 | Brown | |
| 5,538,164 A | * | 7/1996 | Rivas | 222/153.04 |
| 5,667,107 A | | 9/1997 | Lindsey | |
| 5,683,012 A | | 11/1997 | Villaveces | |
| 5,890,636 A | * | 4/1999 | Kibbe | 224/148.6 |
| 5,924,601 A | * | 7/1999 | Chen | 222/175 |
| 5,927,548 A | | 7/1999 | Villaveces | |
| 5,971,232 A | * | 10/1999 | Rohr et al. | 222/494 |
| 6,126,041 A | | 10/2000 | DiTomasso et al. | |
| 6,234,357 B1 | * | 5/2001 | Lewis | 222/175 |
| 6,540,106 B2 | * | 4/2003 | Gerstner | 222/78 |
| 6,581,811 B1 | | 6/2003 | Schillaci | |
| 7,025,231 B2 | * | 4/2006 | Rutherford et al. | 222/181.3 |
| 7,135,011 B2 | * | 11/2006 | Powers et al. | 604/310 |
| 7,316,332 B2 | * | 1/2008 | Powers et al. | 222/175 |
| 2001/0035430 A1 | * | 11/2001 | Litscher | 222/94 |
| 2001/0042758 A1 | | 11/2001 | DiTomasso et al. | |
| 2004/0111071 A1 | * | 6/2004 | Powers et al. | 604/310 |
| 2006/0091156 A1 | * | 5/2006 | Powers et al. | 222/175 |
| 2006/0186135 A1 | * | 8/2006 | Rose et al. | 222/78 |
| 2007/0088298 A1 | * | 4/2007 | Powers et al. | 604/310 |
| 2008/0067193 A1 | * | 3/2008 | Powers et al. | 222/175 |

* cited by examiner

*Primary Examiner* — Frederick C. Nicolas

(57) ABSTRACT

A flexible, body attached device is disclosed for dispensing skin treatment and topically-absorbed medicinal treatments. The device comprises a dispensing reservoir that is caused to dispense treatment through a slit-based diaphragm valve upon the application of simple pressure to the device. Various embodiments of the invention include variations in the structure of the valve, reservoir, and body attachment.

7 Claims, 29 Drawing Sheets

Top  Side  Bottom

Top　　　　　Side　　　　　Bottom

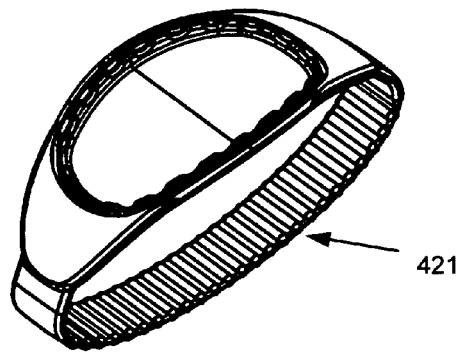
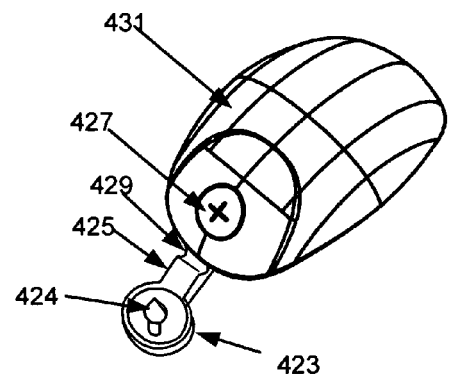
Fig. 20a
Fig. 20b
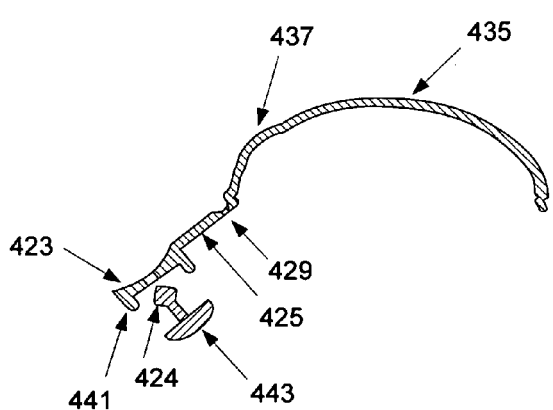
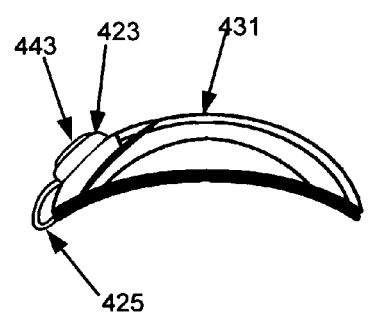
Fig. 20c
Fig. 20d

SKIN TREATMENT DISPENSER AND METHOD OF MANUFACTURE

REFERENCE TO RELATED APPLICATION

This application is a Continuation-in-part of patent application Ser. No. 11/520,962 filed Sep. 14, 2006, which claims priority of provisional patent application Ser. No. 60/716,844 filed Sep. 14, 2005. This application additionally is a Continuation-in-part of patent application Ser. No. 10/915,720 filed on Aug. 10, 2004 (now U.S. Pat. No. 7,316,332), which is a Continuation-in-part of patent application Ser. No. 10/729,757 filed on Dec. 5, 2003 (now U.S. Pat. No. 7,135,011) which is a Continuation-in-part of patent application Ser. No. 10/314,825 filed on Dec. 9, 2002 (now abandoned).

BACKGROUND

Prior Art

The increase in bacterial immunity to modem antibiotics is problematic and one of the chief vectors of infection is the human hand. Hence, when not in the proximity of a washroom to disinfect one's hands, it would be useful to have a means to accomplish such sanitation. Also, in the midst of daily activities, it can be inconvenient to uncap bottles of disinfecting gels or hand lotions to otherwise treat the hands.

Fortunately, it has been established that ethyl alcohol is a most effective antiseptic for gram-negative pathogens; it is of low viscosity, easily dispensed from a portable container, and does not require the use of a material wipe or cloth because of the speed of evaporation. Further, an adequate dose for sanitizing the hands comprises but a few drops of this antiseptic. To prevent chafing, glycerin can be added to the alcohol without levels of viscosity increase that would be deleterious to the dispensing process.

Various methods of portable disinfectant or lotion dispensers have been disclosed in the prior art. These include body-mounted dispensers, wrist bracelet dispensers, and others. U.S. Pat. No. 6,371,946 discloses a dispensing tube that drips liquid onto the hand. U.S. Pat. No. 6,053,898 discloses a tube-fed finger dispenser. A body-worn dispenser of form factor similar to a pager is disclosed in U.S. Pat. No. 5,927,548.

What has not been demonstrated is a low cost dispenser that is wrist-worn that provides ease of actuation, is leakproof, and offers fashion appeal.

SUMMARY OF THE INVENTION

The present invention discloses a wrist-worn device for dispensing a small amount of alcohol-based disinfectant hand rub, moisturizer, other skin medicaments, or even pharmaceutical products that would be used for treating various dermatologic or systemic maladies (the latter being treated through skin absorption of the treatment material).

In a preferred embodiment of the invention, the device is in the form of a low profile, wrist-mounted dispenser with a slit-based diaphragm valve, much like the tricuspid valve of the human heart, that produces a small amount of dispensed medicinal or sanitary treatment when the device is actuated. Various other embodiments of the invention are disclosed which exhibit the following main features: a unibody reservoir/wristband with an inserted valve component, a unibody reservoir/wristband with a valve formed in the reservoir wall, a multiple reservoir device, a reservoir housing and wristband base, a self-contained reservoir that affixes to a wristband, and a self-contained reservoir that removably attaches to a wristband. This latter embodiment permits use of pre-filled disposable reservoirs or selection of reservoirs of different shape or aesthetic appearance. For refill of the device, a simple cap accessory is disclosed that fits commercially-available bottles of hand disinfectant.

To achieve simplicity of construction and yet avoid unintended dispensing and leakage of skin treatment material from the device, the slit-based diaphragm valve can be constructed from material of sufficient stiffness to prevent leakage. Alternatively, the characteristics of the construction material can be used to select a material to achieve this goal. Additionally, various embodiments include caps to mitigate any leakage.

Because only a few drops of alcohol-based disinfectant comprise a dose adequate to achieve sanitation of the hands, the device can dispense hundreds of doses of disinfectant before requiring refill or disposal.

Following is a lexicon of terms that more particularly define the invention and support the meaning of the claims:

Bonded—means adhesively adhered or physically fused together.

Body attachment means—is the physical mechanism for attaching the dispensing device to a human body such as an arm, wrist, leg, or ankle.

Locally-convex—in the context of the invention, means having the shape of a shallow or low amplitude nipple, and exhibiting a curvature that is a departure from that of the surrounding surface.

Single construction—refers to a unibody structure comprising a single component. In the present invention, this definition includes a single molded structure.

Skin treatment—comprises medicinal or sanitary treatment for either dermatological or systemic purposes.

Valve axis—is the axis perpendicular to the plane of the valve and passing through the lateral centroid of the valve.

Wristband—comprises any structure or structures that contribute directly to the wrist attachment function. Hence any extension of the reservoir body, such as a strap, fastener, loop, feature with a slit, etc., that facilitates wrist attachment is included as part of the wristband.

Objects and Advantages

Several objects and advantages of the present invention are:
(a) Provide a convenient, portable means for dispensing skin treatments;
(b) Provide a cost-effective means for dispensing skin and other topically-delivered medical treatments;
(c) Provide an unobtrusive means of dispensing skin and other topically delivered medical treatments;
(d) Provide an easily actuated means of dispensing skin and other topically-delivered medical treatments:
(e) Provide wrist-mounted means of dispensing skin and other topically-delivered medical treatments;
(f) Provide a wrist-mounted disposable means of dispensing skin and other topically-delivered medical treatments;
(g) Provide an easy-to-manufacture skin and other topically-delivered medical treatment dispenser using a slit-based diaphragm valve;
(h) Provide a fashionable dispensing device that is a desirable apparel accessory;
(i) Provide a method of refilling portable means for dispensing skin and other topically-delivered medical treatments.

BRIEF DESCRIPTION OF THE DRAWINGS

FIG. 11b is a cross-sectional diagram of the device of FIG. 11a.

FIG. 14b is a cross-sectional diagram highlighting the topology of the device of FIG. 14a.

FIG. 18b is a pictorial view of a blow molded reservoir that exhibits a groove for snap fitting into the body of FIG. 18a.

FIG. 20a is a pictorial diagram of the wristband shown in FIG. 15.

FIG. 20b is a pictorial diagram of a reservoir housing to be used with the wristband of FIG. 15 which exhibits an attached snap cap.

FIG. 20c is a cross sectional view of the reservoir housing of FIG. 20b with the cap in the open position.

FIG. 20d is a side view of the reservoir housing of FIG. 20b with the cap in the closed position.

FIG. 22b is a cross sectional view of the reservoir of FIG. 21a.

FIG. 22c is an exploded diagram detailing a mode of construction of the reservoir of FIG. 22a.

DETAILED DESCRIPTION OF THE INVENTION

The present invention encompasses various embodiments that variously emphasize ease of manufacture and use, or both.

Preferred Embodiment

Figure 1:
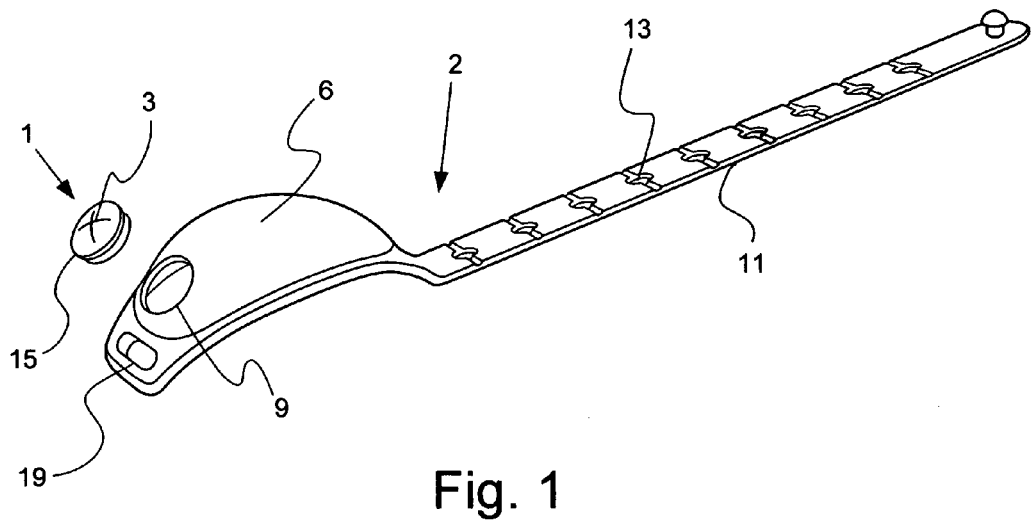
FIG. 1 is a pictorial diagram of an exploded view of the preferred embodiment of the invention.
Figure 2:
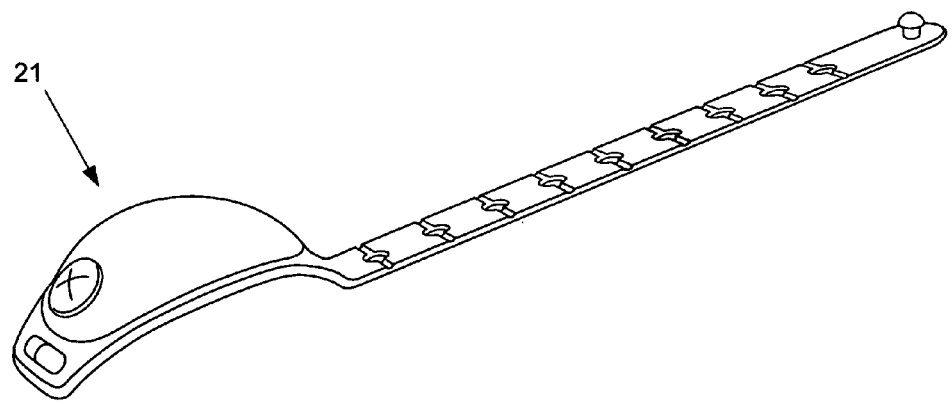
FIG. 2 is a pictorial diagram of the fully constructed preferred embodiment of the invention.
Figure 3A:
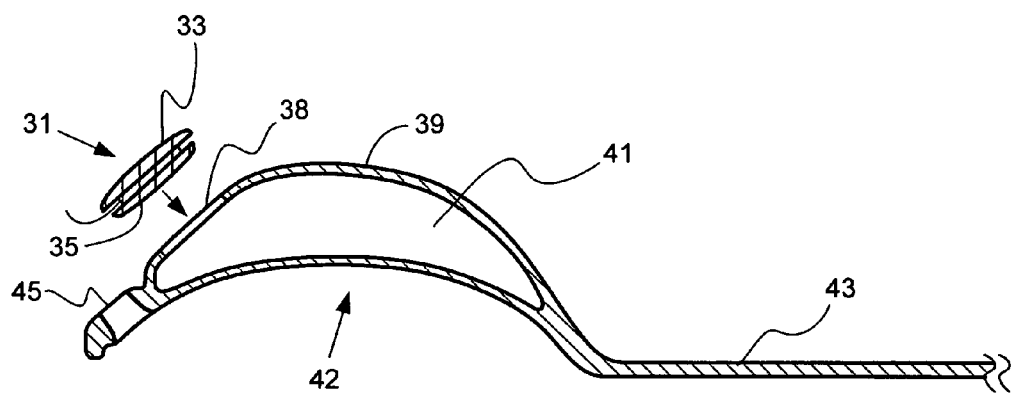
FIG. 3a is a cross-sectional exploded diagram of the preferred embodiment of the invention incorporating a slit-based diaphragm valve exhibiting a convex outer surface.
Figure 3B:
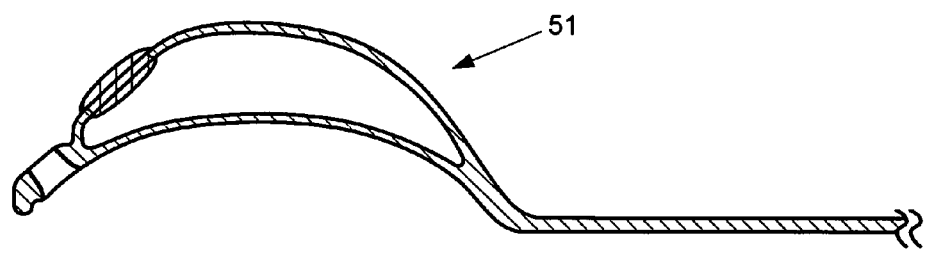
FIG. 3b is a cross-sectional diagram of the preferred embodiment of the invention incorporating a slit-based diaphragm valve exhibiting a convex outer surface with the valve installed in the device reservoir.
Figure 3C:
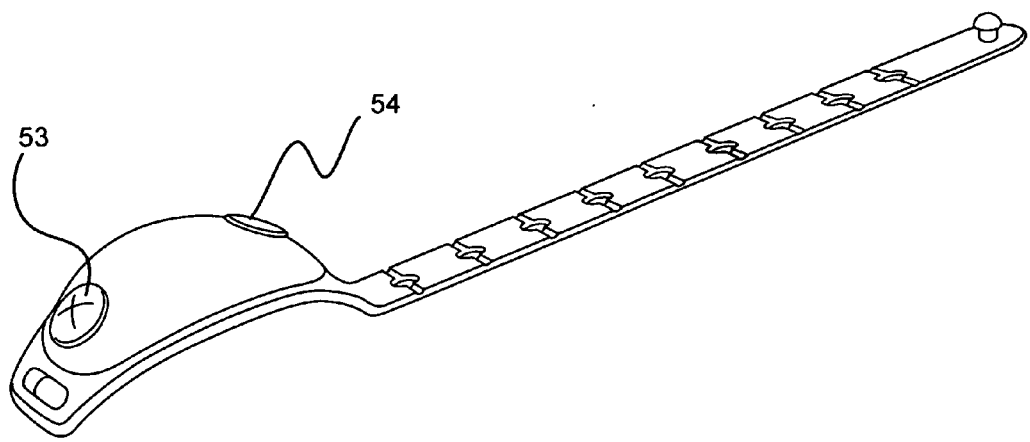
FIG. 3c is a pictorial diagram of a dual reservoir embodiment of the invention.
Figure 3D:
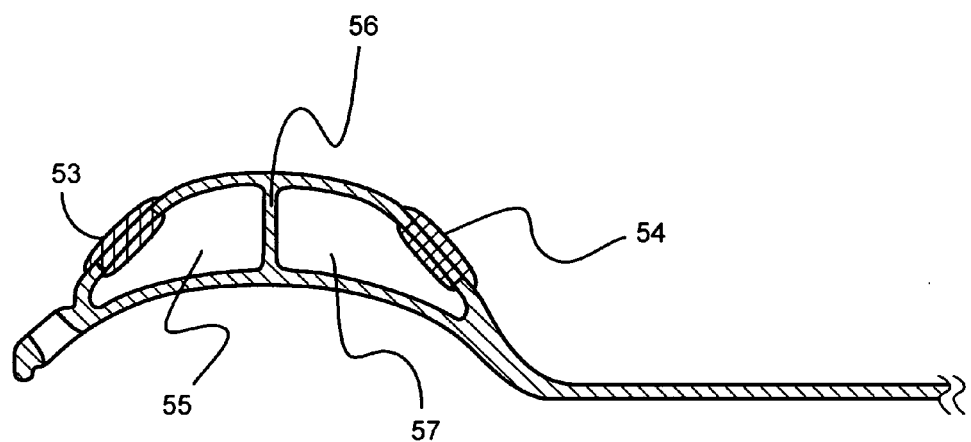
FIG. 3d is a cross-sectional diagram of the device of FIG. 3c.

FIG. 1 depicts a preferred embodiment of the wrist-worn, treatment device comprising two components, a) a device body 2 further comprising dispensing reservoir 6 and body attachment means in the form of a wristband 11, and b) a slit-based diaphragm valve 1. The valve 1 exhibits valve slits 3 in the top button 15 of the valve and has a bottom flange 5 that mounts against the inside surface of the reservoir 6. To affix the device to a person's body, the wristband 11 circumscribes the body extremity and the end is threaded through aperture 19. The protuberance 17 is then snap fit into an appropriate one of the perforations 13 exhibited along the length of the wristband. FIG. 2 depicts the embodiment of FIG. 1 with the valve 1 installed. FIGS. 3a and 3b are cross-sectional views of the device of FIG. 1. In FIG. 3a is shown the valve 31 having a convex outer surface 33, a cylindrical standoff ring 37, and a flange 35. The device body 42 comprises a treatment material reservoir 39 that encloses the treatment volume 41 and a wristband 43. The reservoir wall is shown to be of single construction, i.e. not constructed of joined parts, but a single molding with the wristband. The valve 1 is installed in aperture 38 within the reservoir 39 to form a fluid seal with the reservoir around the valve's perimeter. The device is affixed to a body extremity by insertion of the end of wristband 43 through aperture 45 (this will be shown in greater detail below relative to FIG. 23a through 23c). FIG. 3b depicts the position of the valve installed in device 51. A dual reservoir version 52 of the device is shown in FIGS. 3c and 3d. In the cross-sectional view of the device in FIG. 3d, two reservoir compartments 55 and 57 with associated valves 53 and 54, are depicted respectively. The compartments are shown separated by a thick wall 56 which provides sufficient stiffness to isolate the dispensing pressure for the two compartments.

Figure 4:
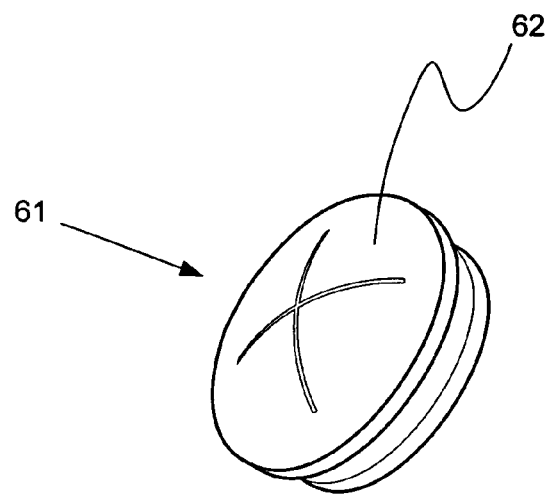
FIG. 4 is a pictorial diagram of a slit-based diaphragm valve having a convex outer surface.
Figure 5:
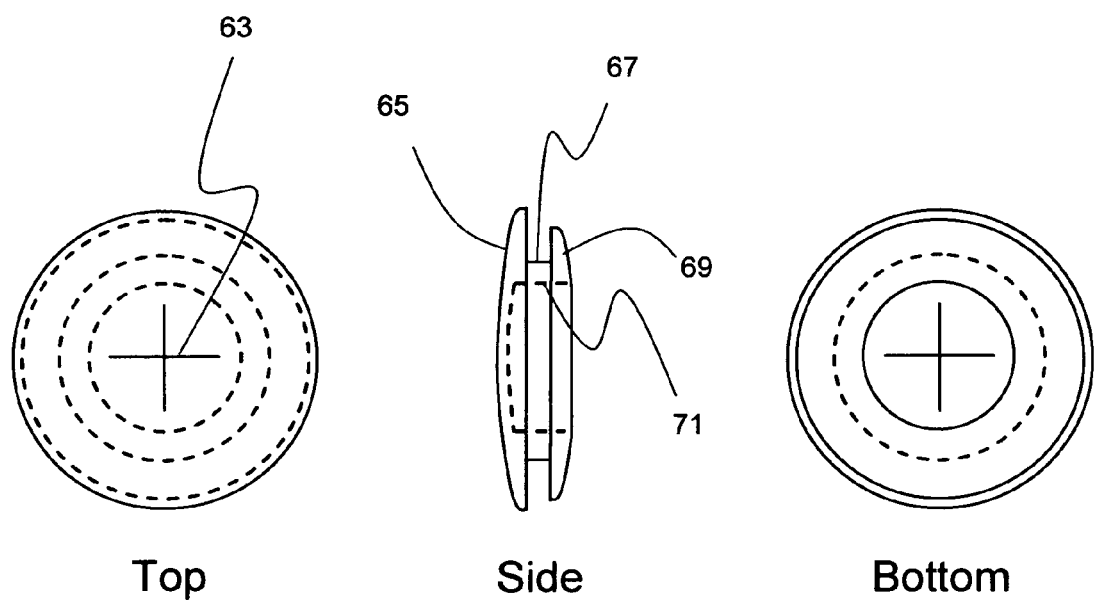
FIG. 5 comprises top and bottom views along with a side cross-sectional diagram of the valve of FIG. 4.
Figure 6:
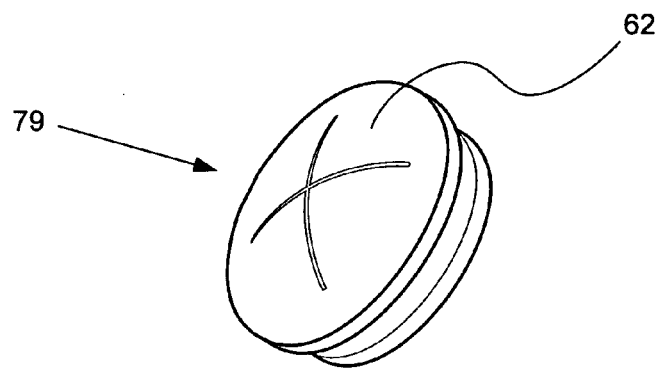
FIG. 6 is a pictorial diagram of a slit-based diaphragm valve having a flat outer surface.
Figure 7:
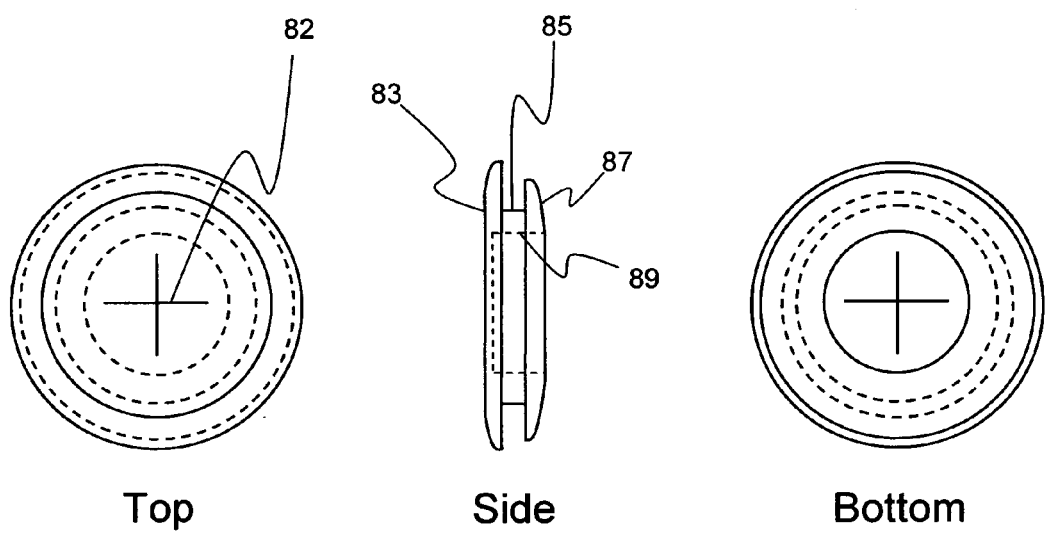
FIG. 7 comprises top and bottom views along with a side cross-sectional diagram of the valve of FIG. 6.

The valve geometry is shown in FIGS. 4 through 7. Prior art slit-based diaphragm valves for dispensing applications are typically inwardly concave to facilitate certain dispensing features. The present invention favors the use of either a convex or flat surface in the vicinity of the dispensing aperture or valve to inhibit accumulation of dispensed material and to facilitate dispensing in ways described below. FIG. 4 is a pictorial diagram of a valve 61 having an outwardly convex exterior surface 62. The detailed structure of the valve is provided by the top, bottom and side cross-sectional view of FIG. 5. Slits 63 are present in the top button 65 to create valve flaps. The top button 65 exhibits a convex outer surface and rests atop a cylindrical ring 67 which is atop a flange 69. When the valve is installed in the reservoir of the device, the flange 69 is mounted against the inside surface of the reservoir surrounding aperture 38 of FIG. 3a. The valve exhibits a cylindrically symmetric hollow interior 71 through which treatment material is dispensed from the reservoir. FIG. 6 is a pictorial diagram of a valve 79 having a flat outer surface 80. The corresponding detail of the valve is provided in FIG. 7. Slits 82 are placed in the button 83 which exhibits a flat outer surface. Button 83 is atop cylindrical ring 85 which in turn is atop flange 89. The valve exhibits a cylindrically symmetric hollow interior 89.

Figure 8A:
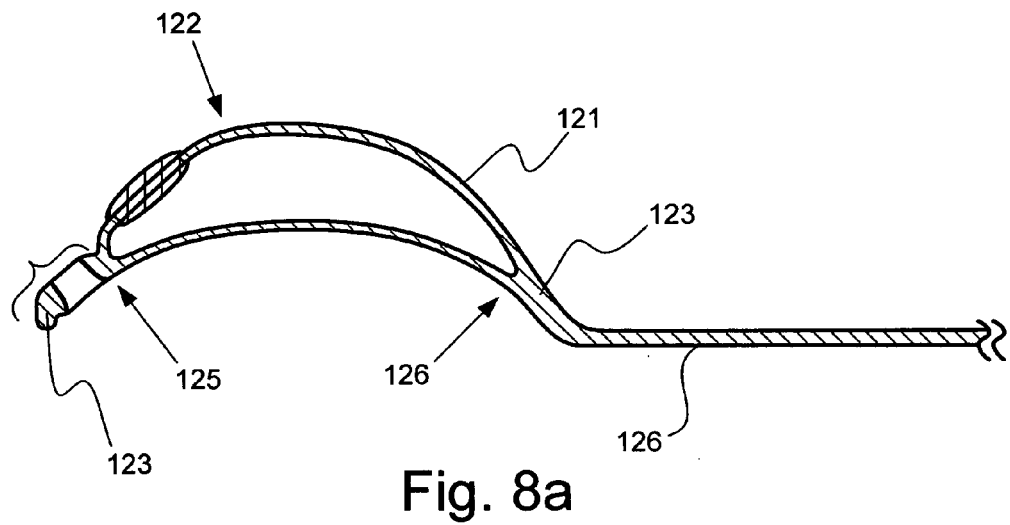
FIG. 8a is a cross-sectional diagram of the device of FIG. 2 depicting the extension of the reservoir wall to form the wristband.
Figure 8B:
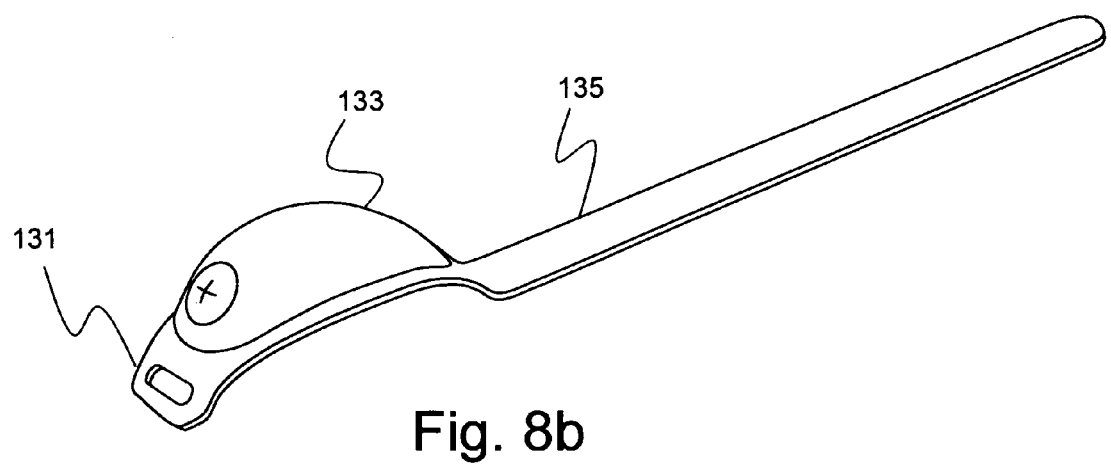
FIG. 8b is a pictorial diagram of the preferred embodiment of the invention exhibiting a first wristband geometry.
Figure 8C:
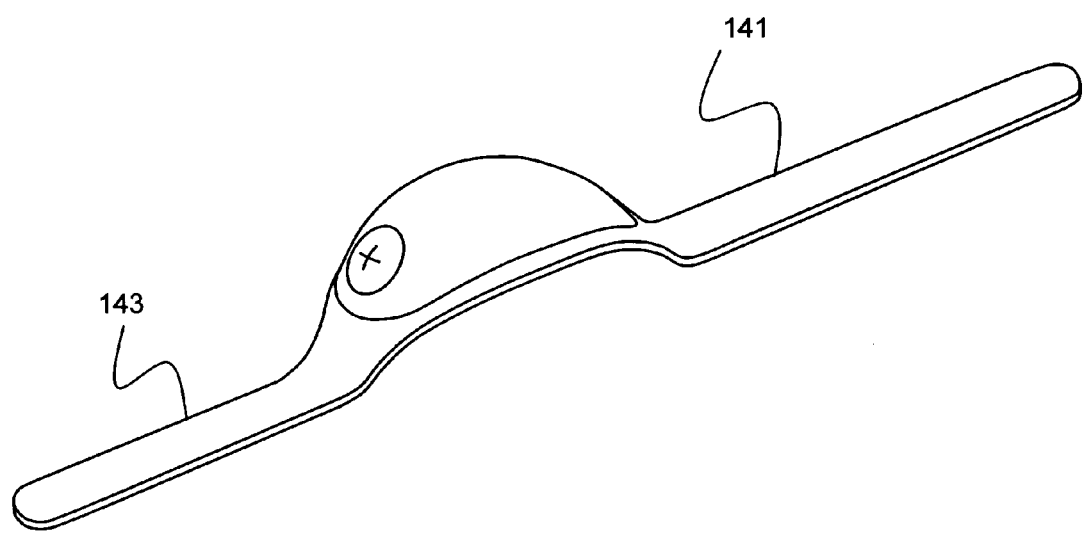
FIG. 8c is a pictorial diagram of the preferred embodiment of the invention exhibiting a second wristband geometry.
Figure 8D:
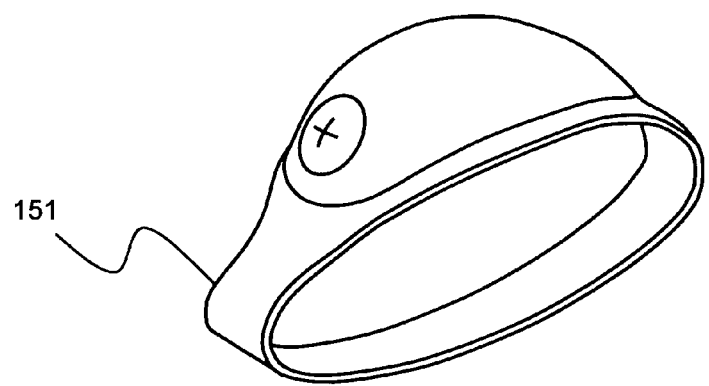
FIG. 8d is a pictorial diagram of the preferred embodiment of the invention exhibiting a third wristband geometry.

The fundamental topology of the device body is illustrated in FIGS. 8a through 8d. The device body comprises the reservoir and the wristband. The cross-sectional diagram of FIG. 8a depicts the wristband 123 as comprising an elongation or extension of the reservoir wall 121 at opposite ends 125 and 127 of the reservoir (at opposing positions about the interior of the reservoir). For the purposes of this disclosure, the wristband is defined as comprising any structure or structures that contribute to the wrist attachment function. So in FIG. 8a, the wristband includes both the portion 124 of the device containing the wristband slit as well as the linear strap 126. This topology is common to the three variations in wristband geometry shown in FIGS. 8b through 8d. FIG. 8b depicts a wristband having a strap 135 at one end of the reservoir and a receiving portion 131 of the wristband at the other end of the reservoir. In FIG. 8c, the wristband straps 141 and 143 extend from both ends of the reservoir and in FIG. 8d, the wristband 151 is a continuous connection between the two reservoir ends.

Manufacture of the Preferred Embodiment

The preferred embodiment can be manufactured using liquid injection molding, insert molding, or transfer molding as is well known in the prior art. Hence, liquid polymer precursors can be introduced through channels into the assembled mold and molding and vulcanization can occur quickly under high temperature. Alternatively, solid polymer can be laid into the separated mold at appropriate locations and the mold halves brought together under pressure and heat to produce the molded article. This would be accomplished for the device body (reservoir with wristband) and separately for the valve. Depending on the process used, there may be the need to remove flashing from the molded article. Also, the molded valve body will need to have slit cut into it to form the functioning valve. This can be accomplished by punch cutting with blades. Most, if not all, of the manufacturing process steps can be automated; this includes insert placement, mold assembly, polymer introduction, molding, mold release, flashing removal, slit formation in the molded valve, device body fixturing for adhesive administration and valve insertion.

Figure 9A:
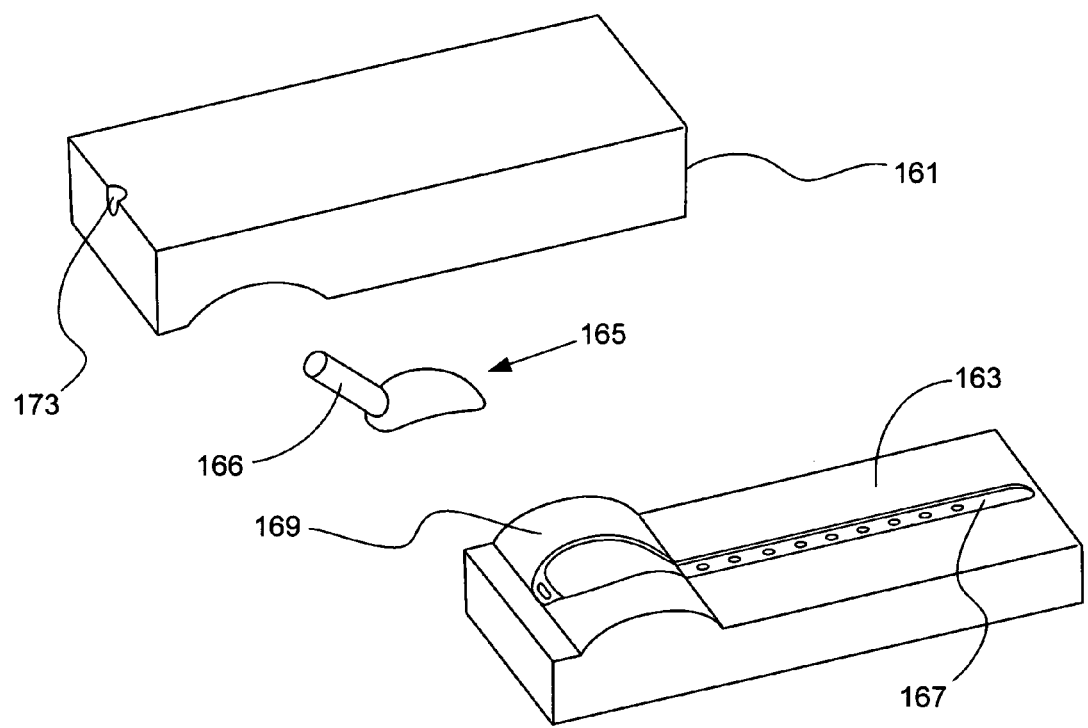
FIG. 9a is a pictorial diagram of two mold halves and a mold insert for manufacture of the body of the device comprising in combination the reservoir and wristband.

FIGS. 9a through 9d depict the use of molds that can represent either press molding of solid polymer or liquid injection molding. For simplicity of illustration, only mold cavities for a single device are depicted, but it should be understood that a multiplicity of device cavities can be included in a single mold set. The mold halves 161 and 163 along with mold insert 165 and associated insert neck 166 are depicted in FIG. 9a. The bottom half 163 of the mold is shown containing the bottom portion of the mold cavity 167 following the mold contour 169 that shapes the molded reservoir for compliance with the wrist or other curved body surface.

Figure 9B:
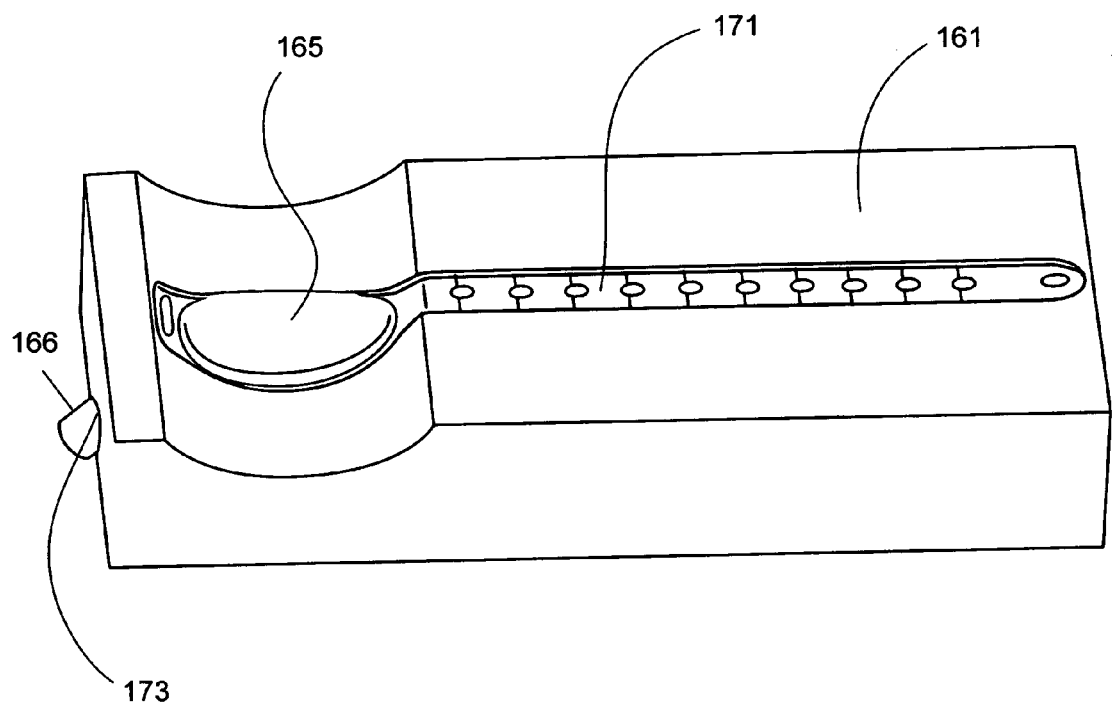
FIG. 9b is a pictorial diagram of one half of the mold containing the mold insert.
Figure 9C:
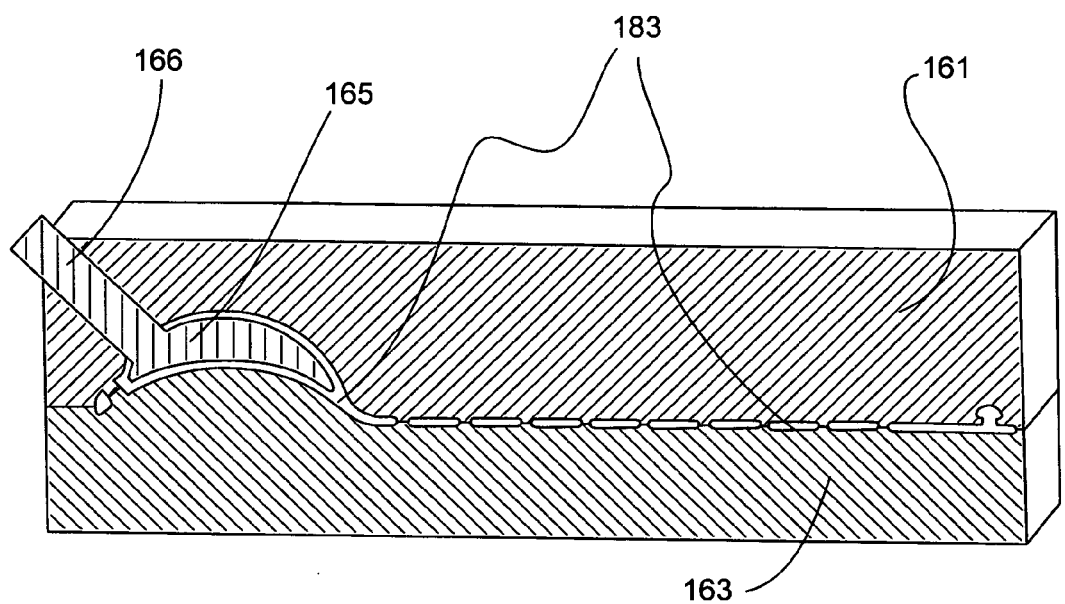
FIG. 9c is a pictorial diagram of the mold halves together with the captivated insert showing the molding of contained polymer into the form of the reservoir and wristband body of the device.
Figure 9D:
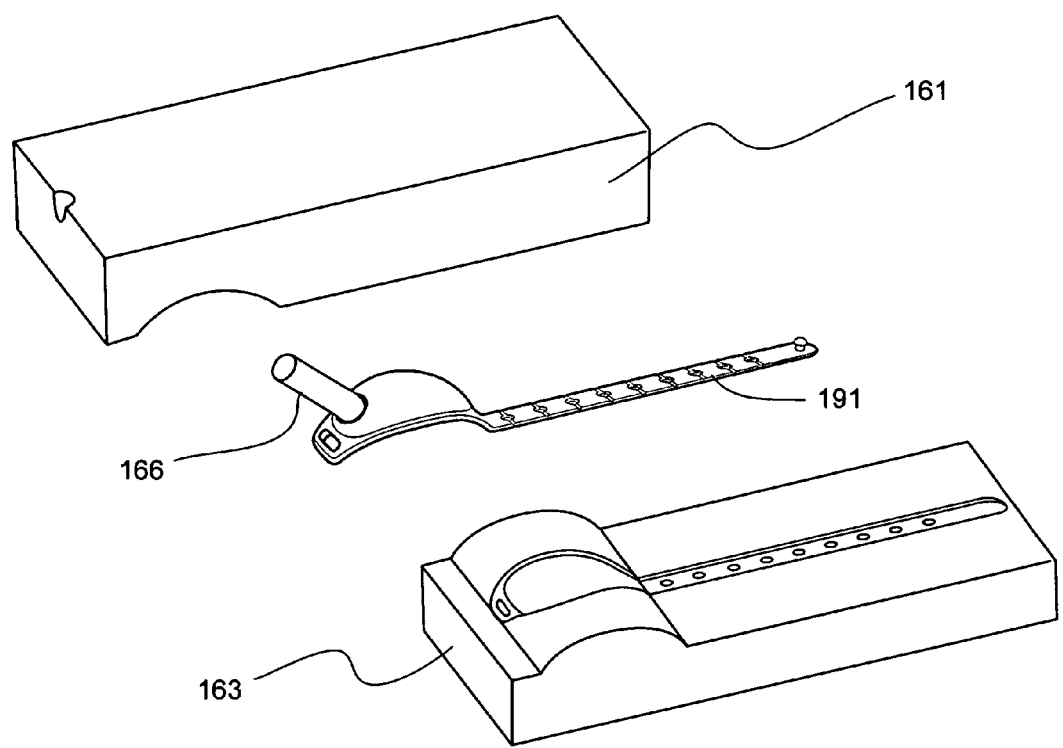
FIG. 9d is a pictorial diagram showing separation of the mold halves with the resulting molded body of the device containing the mold insert.

In FIG. 9b, the mold insert 165 that will form the device reservoir cavity upon filling of the mold with polymer or polymer precursors is shown placed in its proper position within the upper portion of the mold cavity 171, contained in the upper half 161 of the mold. The neck 166 of the insert 165 passes through channel 173 in the upper half 161 of the mold. Neck 166 creates the reservoir aperture into which the valve will be inserted subsequent to molding and provides a means for seating the insert 165 so that it stands off from the mold cavity thereby permitting the reservoir to be formed. The assembled mold is shown in cross section in FIG. 9c. The mold halves 161 and 163 are brought together with the insert 165 contained therein. The mold cavity 183 is depicted as filled with either polymer or polymer precursors. Separation of the mold halves 161 and 163 and depiction of the molded device body 191 with the protruding insert neck 166 is shown in FIG. 9d. The insert can be removed from the reservoir of the molded device body either manually or automatically. Manual removal involves stretching the reservoir adjacent the insert neck 166 and peeling it off the insert. To facilitate automated removal, pressurized air passages can be made part of the insert. These passages, internal to the insert, would extend from the insert neck 166 to the surface of the insert that would be covered with polymer. Pressurization of the passages during molding would prevent polymer intrusion into such passages. Pressurization of the passages after device release from the mold would balloon the reservoir for insert removal using manipulators that would pull the polymer away from the insert. A more expensive alternative that might be justified by very large volume production involves use of a mechanically collapsible insert that could be withdrawn from the molded reservoir through the reservoir aperture without substantial deformation of the reservoir.

Figure 10A:
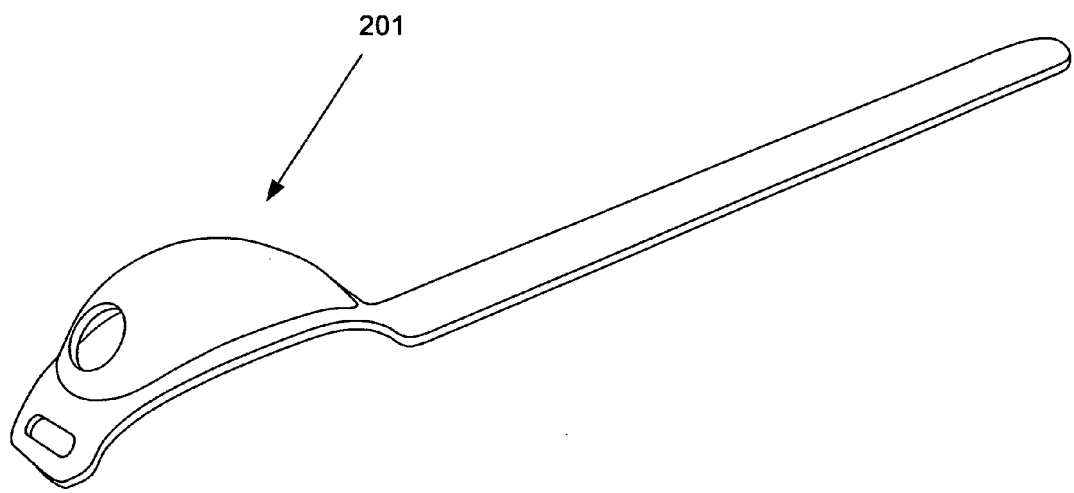
FIG. 10a is a pictorial diagram of the molded body of the device.
Figure 10B:
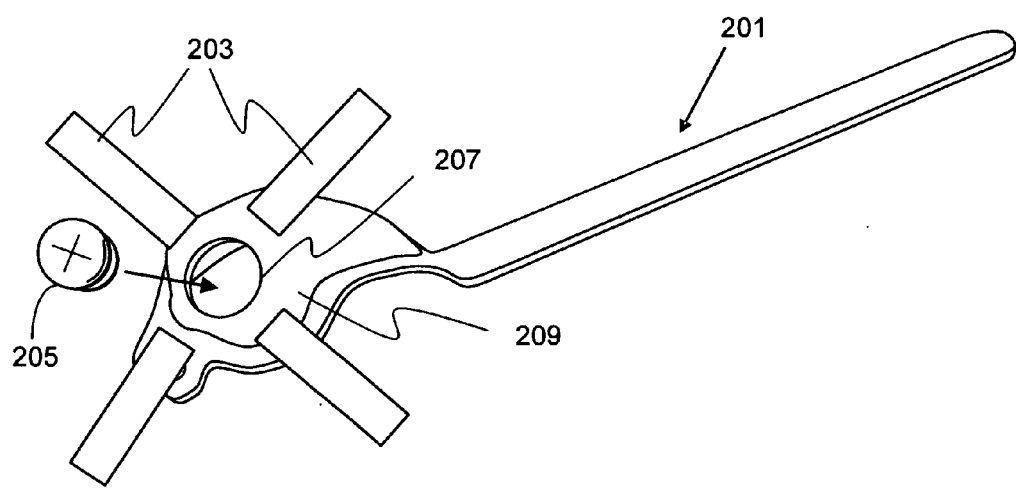
FIG. 10b is a pictorial diagram of the body of the device under deformation for the acceptance of the valve component.

Subsequent to production of the device body and the valve, the valve can be installed in the device body either manually or automatically. FIG. 10a depicts the device body 201 exhibiting the valve aperture in the reservoir. In order to install the valve 205 shown in FIG. 10b, first adhesive or polymer precursor is applied to the perimeter of the aperture 207. Then the reservoir 209 must be deformed to elastically enlarge the aperture 207. This is shown being accomplished by manipulators 203 which can be clamps or can be fingers that achieve frictional traction on the surface of the reservoir. The valve 205 is placed in the aperture and the reservoir permitted to seat against the valve cylindrical ring 67 shown in FIG. 5. Optionally, heating can be applied to cure the adhesive or polymer precursor.

Candidate polymers for molding of the device include the many silicone elastomer formulations. These polymers are alcohol permeable, but for many uses of the present invention, ethyl alcohol contents of the reservoir will be consumed by use of the invention before significant permeation loss occurs. Nevertheless, application of alcohol-impermeable fluoropolymer overcoatings for the reservoir and valve can be considered. Such coatings would adequately match the elasticity of the underlying silicone polymer. Alternatively, use can be made of an ethyl alcohol impermeable polyisobutylene replacement for silicone rubber formulated by Professor Judit Puskas of the University of Akron.

Alternate Embodiments

Figure 11A:
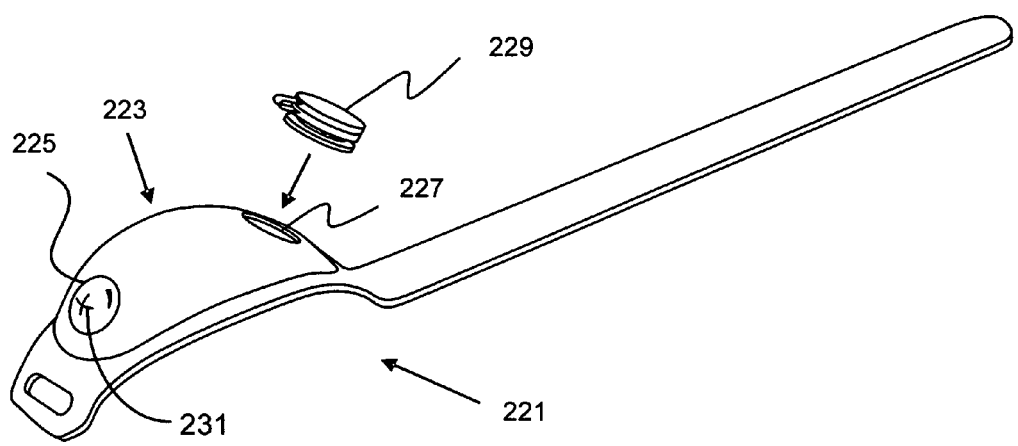
FIG. 11a is a pictorial diagram of an embodiment of the device having a slit-based diaphragm valve formed by slits placed in a raised (nippled) area of the reservoir wall and including a capped refill opening.
Figure 11B:
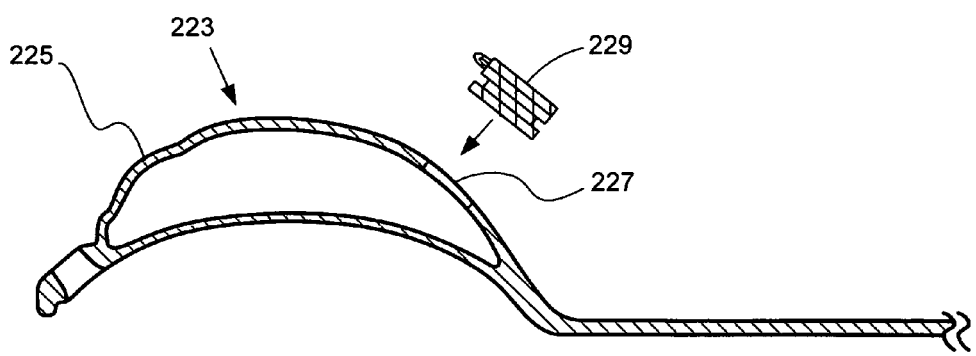
Figure 11C:
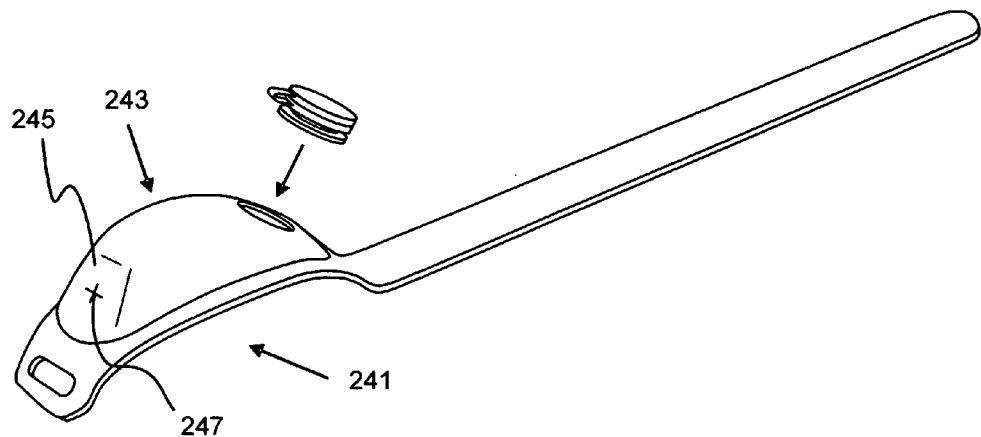
FIG. 11c is a pictorial diagram of an embodiment of the device having a slit-based diaphragm valve formed by slits placed in a flat (planar) area of the reservoir wall and including a capped refill opening.
Figure 11D:
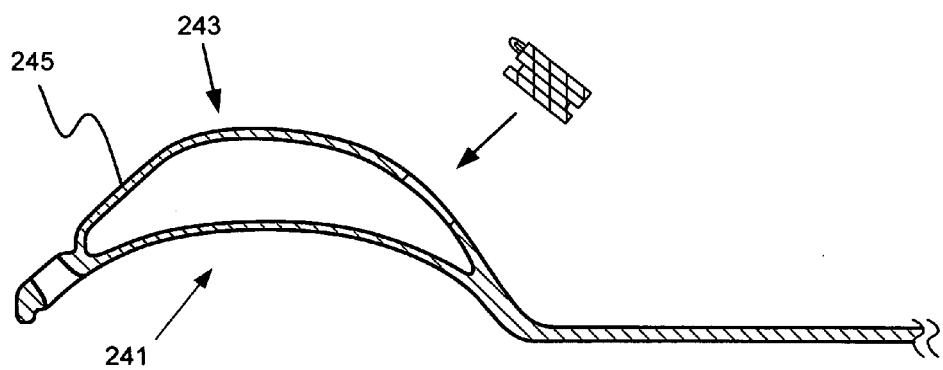
FIG. 11d is a cross-sectional diagram of the device of FIG. 11c.

The slit-based diaphragm valve can be created by the formation of slits in the wall of the device reservoir. FIGS. 11a through 11d depict variations on this embodiment of the invention. FIG. 11a shows a slit-based diaphragm valve formed by cutting slits 231 into a shallow convex surface, or nipple 225, extending above the surrounding surface of the reservoir 223. The refill aperture 227 accommodates the mold insert neck during molding and receives the refill cap component 229 to complete manufacture of the device. The refill cap component 229 is a snap closure with a tether connecting the cap lid to the cap body. It is sealed into the refill aperture 227 in a fashion similar to the sealing of the diaphragm valve component of FIG. 10b into the valve aperture. The cross-sectional view of the device body of FIG. 11a is shown in FIG. 11b. FIG. 11c shows a slit-based diaphragm valve formed by cutting slits 247 into a flat (planar) surface region 245, of the reservoir 243. The cross-sectional view of the device body of FIG. 11c is shown in FIG. 11d.

Figure 12:
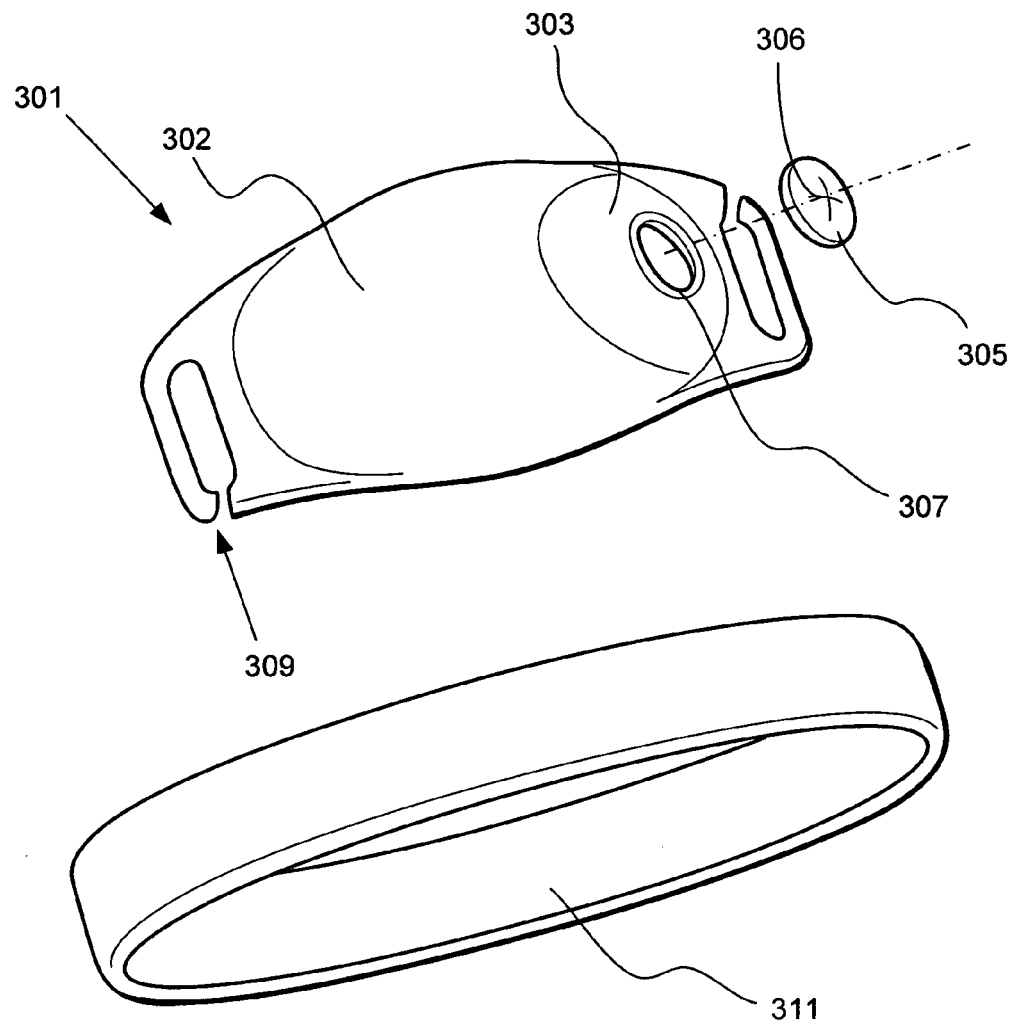
FIG. 12 is a pictorial diagram that shows a reservoir with snap in slit-based diaphragm valve and polymeric band.

FIG. 12 depicts a wrist-worn, treatment-dispensing device 301 comprising a blow-molded reservoir body 302 having an aperture 307 for receipt of a snap-in slit-based diaphragm valve component 305. A pronounced region 303 of the reservoir provides structural support of the slit-based diaphragm valve component 305. A candidate material for the reservoir body 302 is 0.5 millimeter thick low density polyethylene. The injection molded valve component 305 can be made from silicone rubber shore A—15 to 20 hardness with die cut slits 306. Slots 309 at opposing ends of the reservoir provide for the introduction of a polymeric wristband 311 similar to novelty wristbands currently on the market. The reservoir is constructed of pliable polymer material so that adequate manual pressure to the upper surface of the reservoir will cause hand treatment material to be dispensed from the slit-based diaphragm valve component 305.

Figure 13:
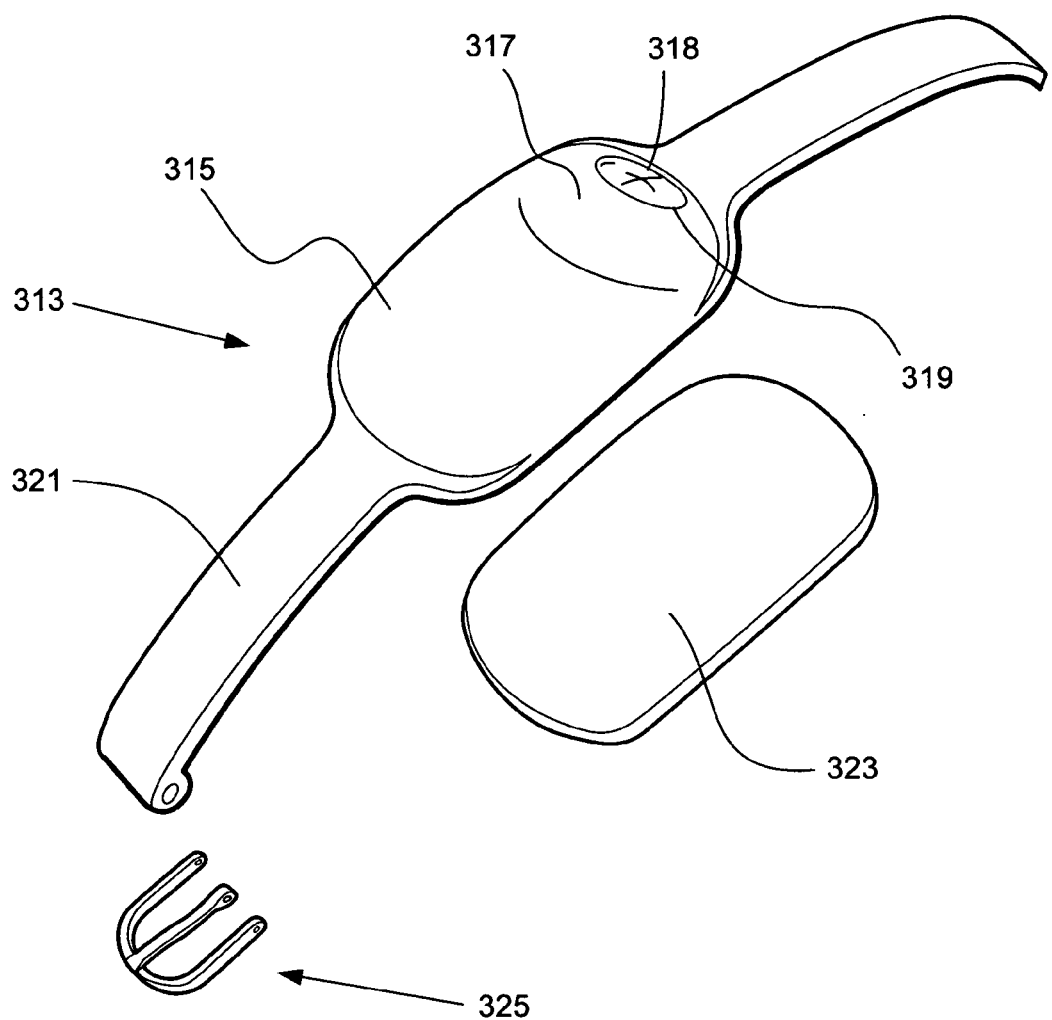
FIG. 13 is a pictorial diagram of an integral injection molded reservoir top with slit-based diaphragm valve and a separate injection molded reservoir base that is to be bonded to the reservoir top.

FIG. 13 is a pictorial diagram of a wrist-worn, treatment-dispensing device 313 comprising an injection molded reservoir top 315 with integral slit-based diaphragm valve 318 cut into a shallow convex surface, or nipple 319, extending above the surrounding pronounced region 317 of the reservoir top 315, a wristband 321, and a separate injection molded reservoir base 323 that is to be bonded to the reservoir top 315. Similarly to the exterior surface geometry of the valve in FIG. 3b, the nipple 319 serves several purposes, providing: a) a visual indication of the dispending region of the device, b) a proud surface for an easy dean and wipe after dispensing, c) tactile feedback for the dispensing location, promoting ease of casual, surreptitious dispensing (avoiding the need to look at the dispenser when dispensing that might draw the attention of others), d) a crown that provides adequate stiffness for leak prevention, and e) an indexing surface for secondary manufacturing operations such as slit placement. Also, the interior surface of this nipple can be tapered radially from its center to promote valve flap operation. The pronounced region 317 of the reservoir top 315 provides structural support to the integral slit-based diaphragm valve 318. The reservoir top 315 can be manufactured easily from a 1.0 millimeter thickness of silicone rubber, shore A—15 to 20 hardness with die cut valve slits. Candidate materials for the reservoir base include urethane or propylene. A standard watchband buckle 325 can be used with wristband 321.

Figure 14A:
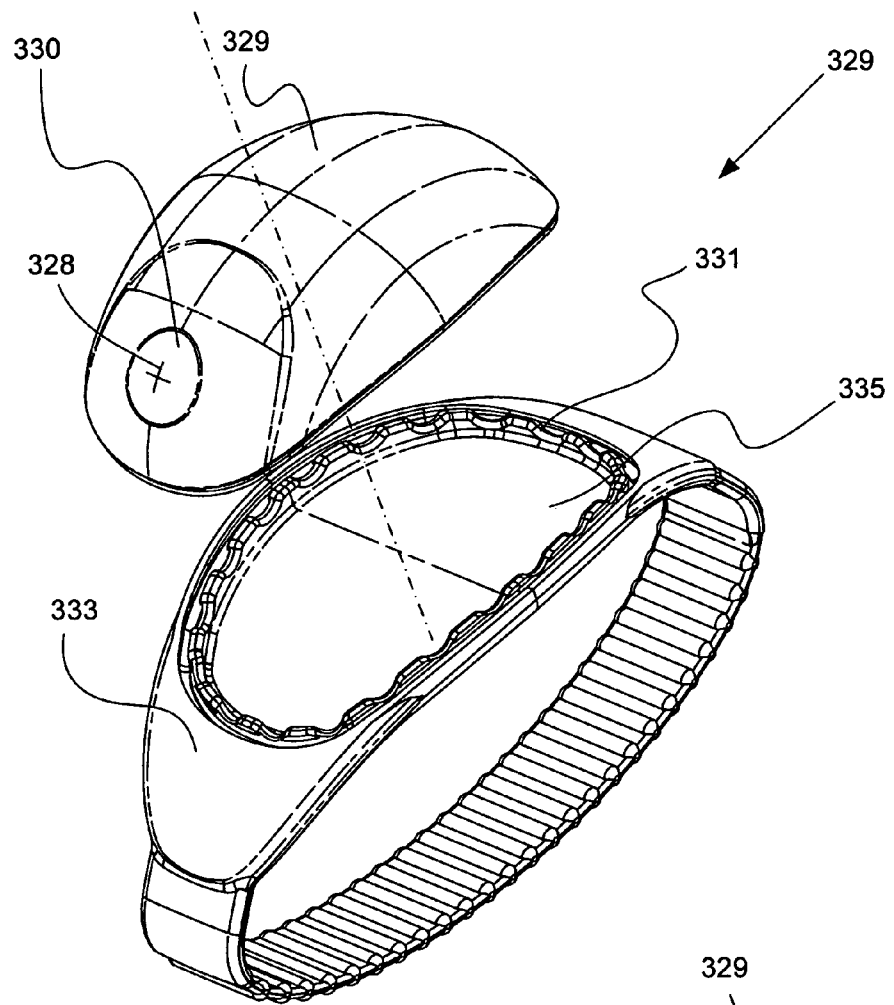
FIG. 14a is a pictorial diagram of an injection molded wristband with attachable blow molded reservoir housing containing a slit-based diaphragm valve.
Figure 14B:
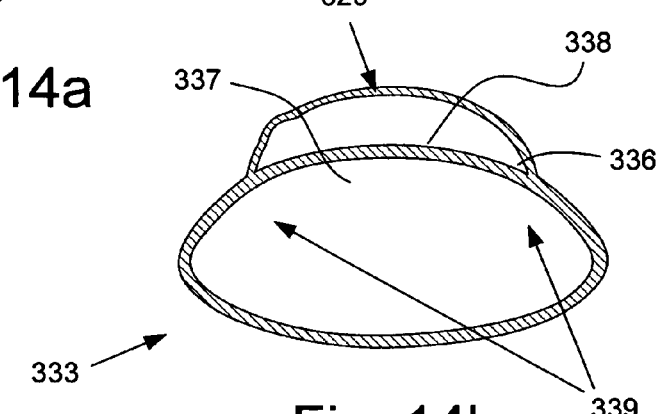

A blow-molded reservoir housing 329 and separate wristband 333 comprise the wrist-worn, treatment-dispensing device 327 of FIG. 14a. Again, the slit-based diaphragm valve 328 is shown integral to the reservoir 329. The valve slits are cut into a shallow convex surface, or nipple 330. The depression region 335 of wristband 333, which forms the lower portion of the reservoir, exhibits a scalloped ridge 331 within the perimeter of this depression region. FIG. 14b is a cross-sectional diagram representing the topology of the device of FIG. 14a. The dispensing reservoir 329 exhibits an interior volume 338 formed by an upper portion 336 and a lower portion 337 of reservoir 329 and the flexible wristband 333 comprises elongation or extension of the lower reservoir portion 337 at substantially opposing positions 339 about said interior volume 338.

Figure 15A:
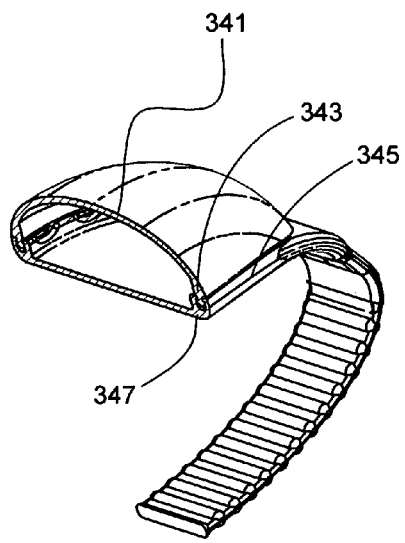
FIG. 15a is a pictorial diagram of a wristband-attachable reservoir housing seated in a receiving wristband showing the cross-section of the attachment geometry around the perimeter of the reservoir.
Figure 15B:
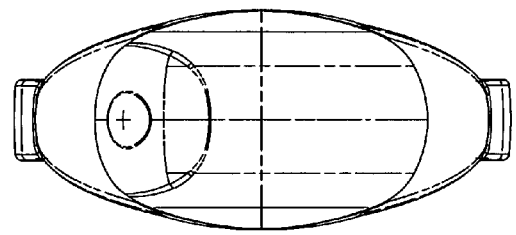
FIG. 15b is a top view pictorial diagram of an attachable reservoir housing with wristband.
Figure 15D:
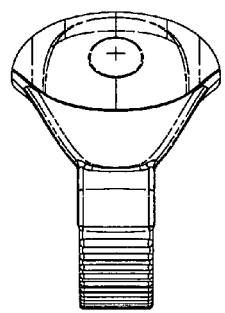
FIG. 15d is a front view pictorial diagram of an attachable reservoir housing with wristband.
Figure 15C:
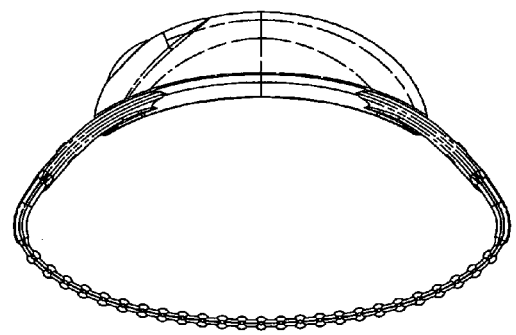
FIG. 15c is side view pictorial diagram of an attachable reservoir housing with wristband.

The ridge 331 will permit attachment of the reservoir 329 to the wristband 333 as shown in FIG. 15a, a pictorial view of the attachment region with a hidden cross-sectional view 341 of the attachment of reservoir to wristband. Attachment is achieved by snapping the male insert 343, protruding at various positions from the perimeter of the reservoir housing 329, into a corresponding female channel 347 of the wristband 345. A female channel 347 is created in the molding of each apex of scalloped ridge 331 of FIG. 14a. This geometry allows the flexibility of the reservoir housing 329 to be maintained when the reservoir and wristband are bonded together. FIGS. 15b through 15d provide top, side and front views, respectively, of the wrist-worn device 327 of FIG. 15a.

Figure 16A:
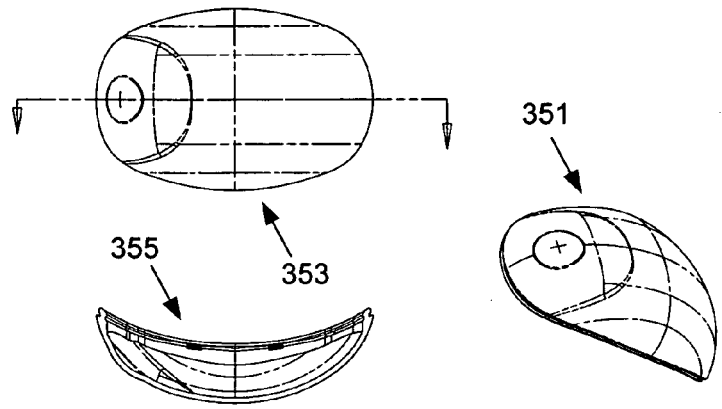
FIG. 16a comprises pictorial, plan, and section views of the dispenser reservoir housing.
Figure 16B:
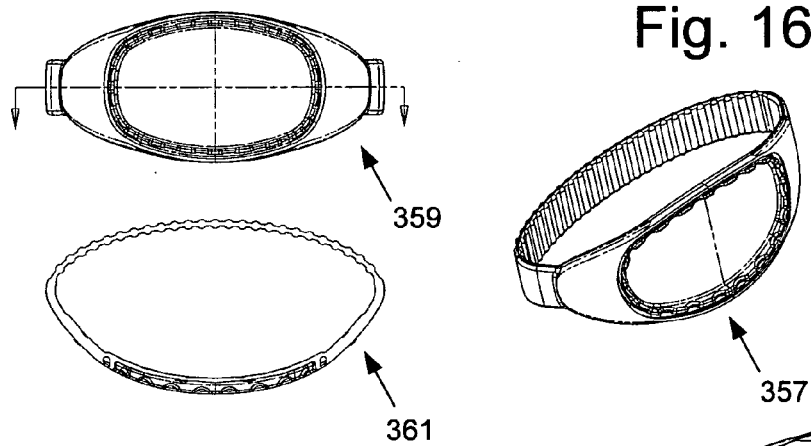
FIG. 16b comprises pictorial, plan, and section views of the dispenser wristband.
Figure 16C:
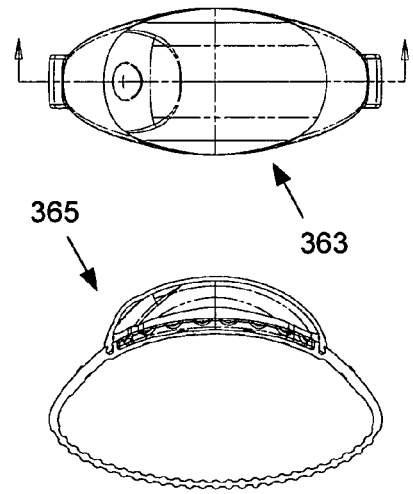
FIG. 16c comprises plan and section views of the composite dispenser.

FIGS. 16a, 16b, and 16c provide the plan and associated section views of the reservoir, wristband, and composite dispenser of FIG. 14a, respectively. Shown are pictorial views 351 and 357 of reservoir and wristband, respectively, plan views 353, 359, and 363 of reservoir, wristband, and composite dispenser, respectively, and section views 355, 361, and 365 of reservoir, wristband, and composite dispenser, respectively.

Alternate Reservoir to Wristband Attachment Approaches

Figure 17A:
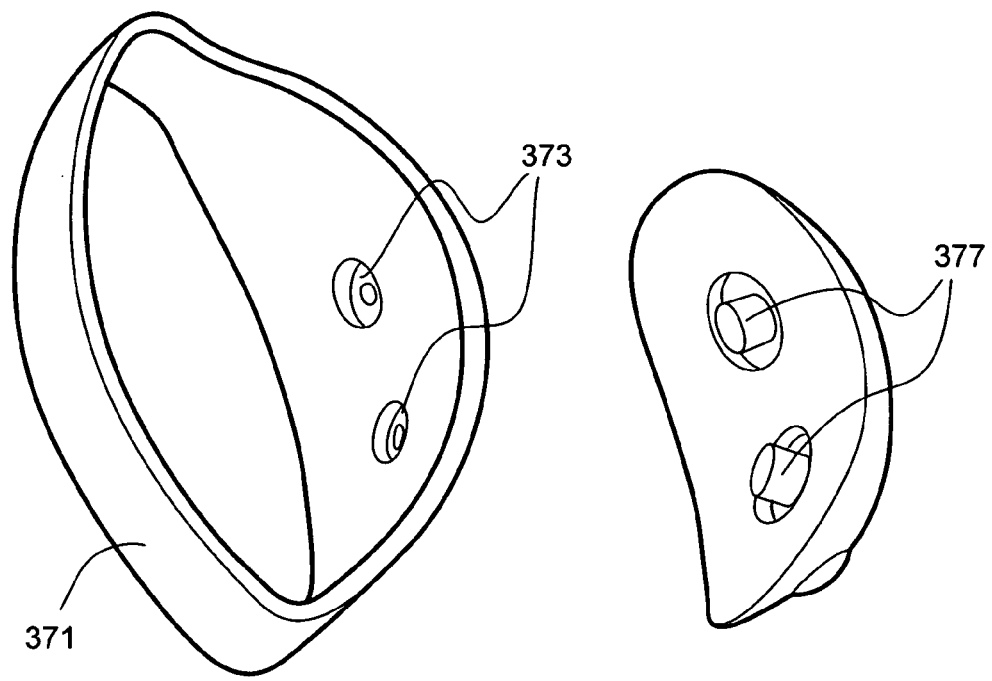
FIG. 17a is a pictorial view of the reservoir and wristband attachable by snap means showing the protrusions under the reservoir.
Figure 17B:
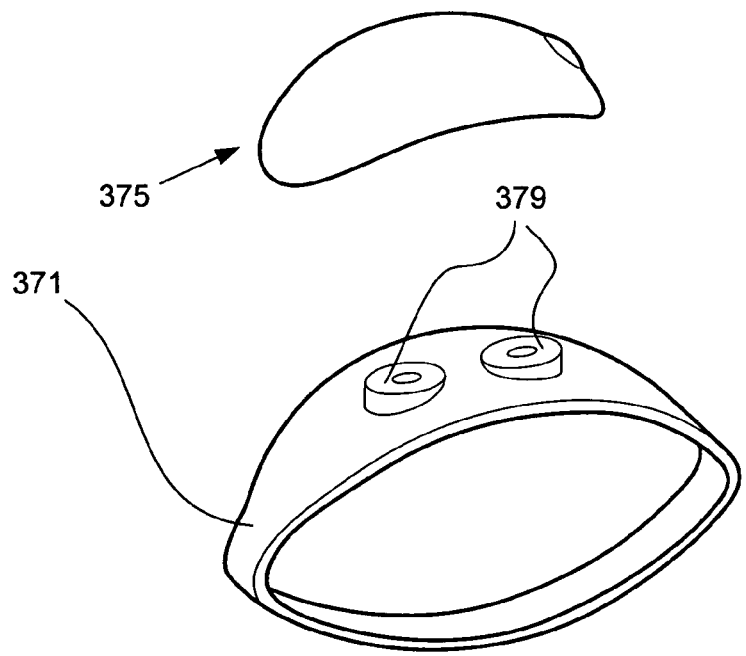
FIG. 17b is a pictorial view of the reservoir and wristband attachable by snap means showing the receiving apertures in the wristband.

FIGS. 17a and 17b depict a means of snap fitting the reservoir 375 to wristband 371. In FIG. 17a the snap protrusions 377 are shown on the underside of the reservoir 375 and the corresponding receiving holes 373 are shown in the wristband 371. In FIG. 17b the cylindrical mounts 379 with receiving holes are shown. This amounts to having sets of complimentary gender snap components on the reservoir and wristband, respectively.

Figure 18A:
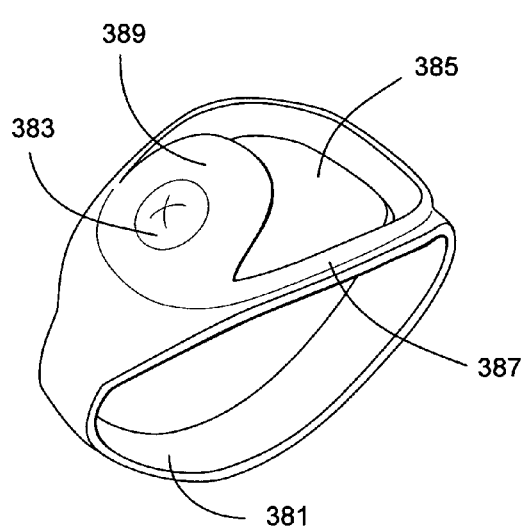
FIG. 18a is a pictorial view of a unibody valve-wristband body.
Figure 18B:
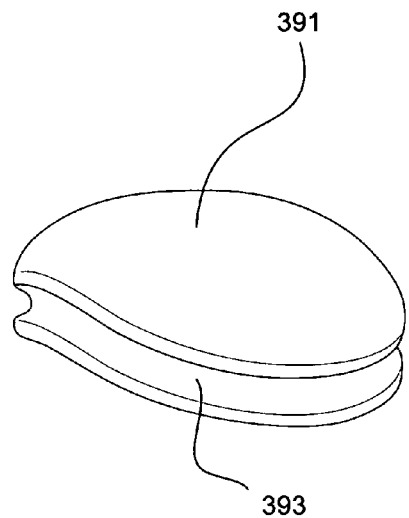
Figure 18C:
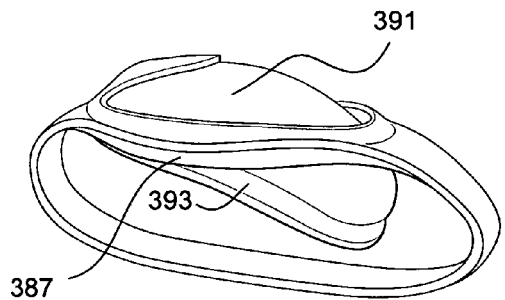
FIG. 18c is a pictorial view of the reservoir being inserted into the valve-wristband body.
Figure 18D:
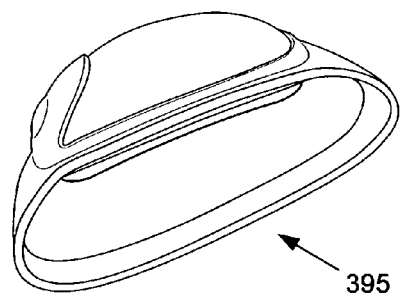
FIG. 18d is a pictorial view of the assembled dispenser of FIG. 18c.

An alternate means of reservoir attachment is shown in FIGS. 18a through 18d. In FIG. 18a, is shown a unibody valve-wristband body, preferably manufactured from silicon polymer, comprising the band 381, slit-based diaphragm valve 383 surrounded by support surface 389, and a ring of material 387 that surrounds the space 385 for the reservoir. The reservoir 391 is shown in FIG. 18b having a groove 393 that will permit its snap fit into the ring 387 of FIG. 18a. FIG. 18c depicts the insertion of the reservoir 391 into the valve-wristband body. The fully assembled device 395 is shown in FIG. 18d. The support surface 389 of the valve-wristband body will need to be bonded or mechanically attached to the reservoir so that valve 383 is seated over a hole (not shown) in reservoir 385.

Yet another category of attachment approaches involves the use of guide tracks with complimentary guides so that the wristband and reservoir can be slid together and "locked" in place with a simple captivating tab. The guide can be a linear feature on one component (wristband or reservoir) that fits a complimentary linear keyway on the other component.

Valve Caps

Figure 19A:
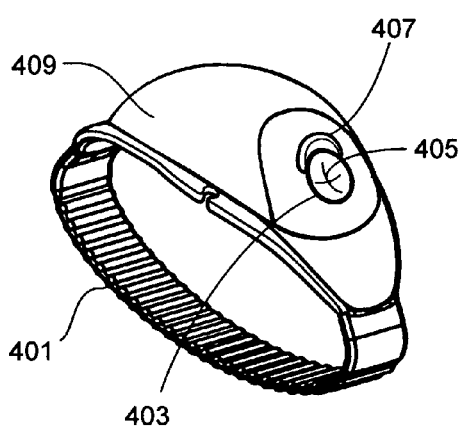
FIG. 19a is a pictorial diagram of a dispenser body having provision for a D-ring-based cap mechanism.
Figure 19C:
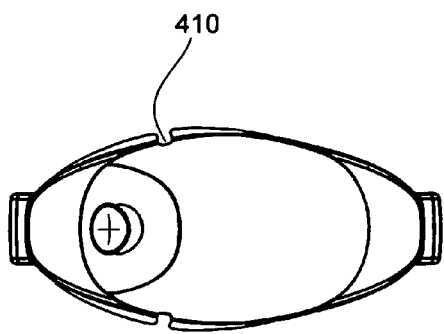
FIG. 19c is a plan view diagram of the dispenser body of FIG. 19a, highlighting the notches that hold the D-ring cap mechanism.
Figure 19B:
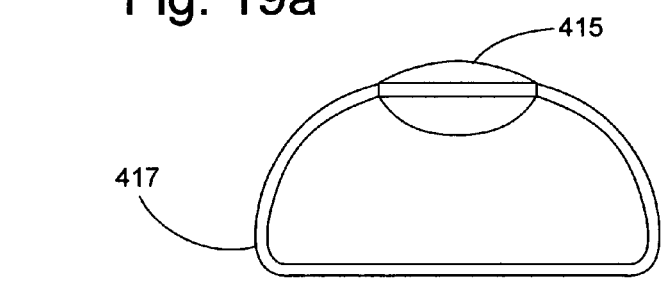
FIG. 19b is a cross sectional view of a D-ring cap mechanism.
Figure 19D:
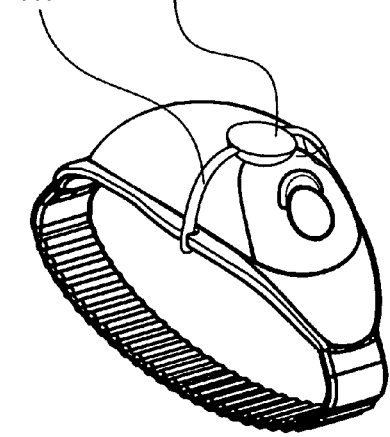
FIG. 19d is a pictorial diagram of the dispenser of FIG. 19a including the D-ring cap mechanism in the open position.
Figure 19E:
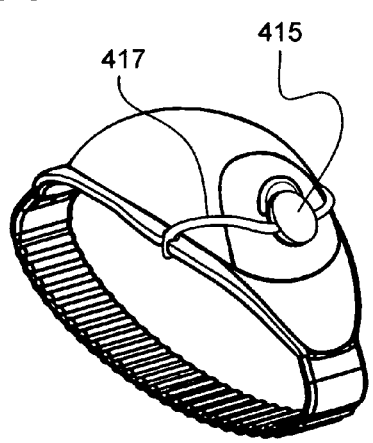
FIG. 19e is a pictorial diagram of the dispenser of FIG. 19a including the D-ring cap mechanism in the closed position.

FIGS. 19a through 19e depict the use of a cap that is slid into place to prevent leakage and inadvertent dispensing. In FIG. 19a, is shown a reservoir 409 attached to wristband 401. The slit-based dispensing valve area 405 is made concave to accept the dimple-shaped cap and a feature 407 is added to the reservoir housing to hold the cap in place. In FIG. 19c, notches 410 are shown in the perimeter of the reservoir that will accept the D-ring 417 of FIG. 19b. This D-ring can be fabricated from rigid or semi-rigid materials such as metal or plastics. The cap 415 is shown in cross section in FIG. 19b. FIGS. 19d and 19e show the device with the D-ring and cap in the open and closed positions, respectively.

FIGS. 20a through 20d show a snap cap embodiment. FIG. 20a is a pictorial diagram of the wristband component 421 that will, as before, accept the reservoir having the presently-described cap design. Shown attached to the reservoir 431 of FIG. 20b is a cap 423 exhibiting a tapered plug 424 that is inserted into the valve 427 to achieve closure. The cap attachment band 425 features a thinned region 429 in the vicinity of attachment that promotes ease of flexion. FIG. 20c is a cross section view of the reservoir of FIG. 20b. It is shown that the plug 424 is integral to a cylindrical base 443 of short height and is inserted through a hole in cap 423. FIG. 20d is a side pictorial view of the reservoir with the cap placed to seal the valve area.

Alternate Valves and Closures

Figure 21A:
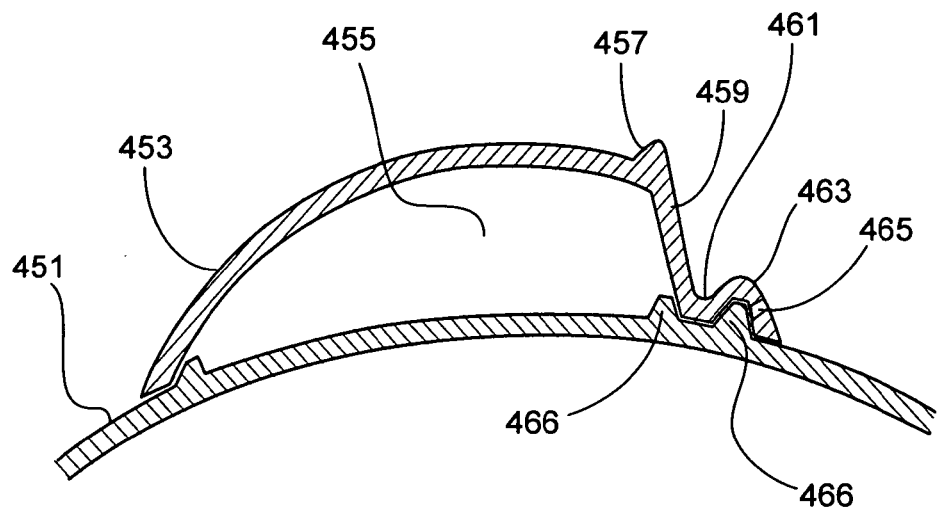
FIG. 21a is a cross sectional view of a reservoir with a deformable dispensing valve in the closed position.
Figure 21B:
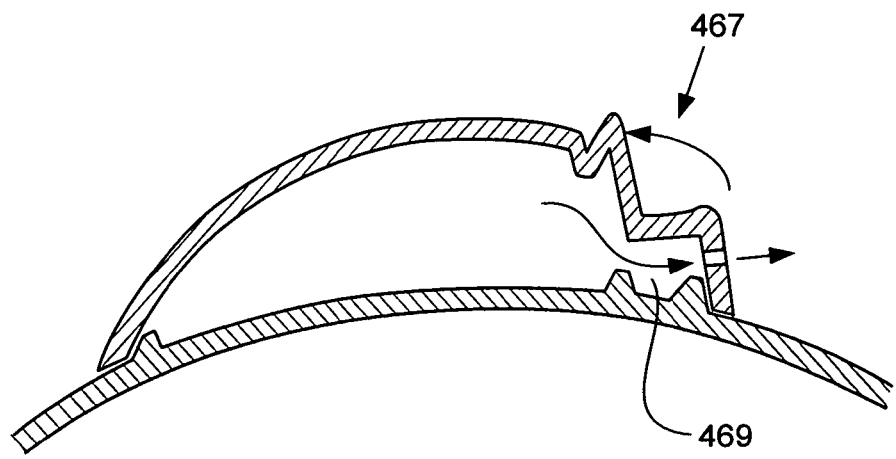
FIG. 21b is a cross sectional view of a reservoir with the deformable dispensing valve of FIG. 21a in the open position.

FIG. 21a is a cross sectional view of deformable valve mechanism that is in the closed position. The reservoir housing 453 is attached to the wristband 451 to provide a volume 455 containing the material to be dispensed. The upper surface of the reservoir and a portion of seating area of the wristband are modified to achieve the valve function of this embodiment. A protuberance 457 is provided so that manual pressure can easily be applied at this location to effect actuation of the valve. The reservoir housing 453 contributes to the valve functionality by means of a slanted vertical wall 459, a depression 461, and a shallow nipple 463 having a dispensing aperture 465 on the side away from the depression 461. The wristband component contributes ridges 466 that cooperate with the depression 461 to interlock and seal off the aperture 465 from the dispensing volume 455 when there is no left-directed horizontal pressure applied to protuberance 457. Actuation to open the valve and permit fluid communication 469 between volume 455 and aperture 465 is depicted In FIG. 21b with the application of force in direction 467.

Figure 22A:
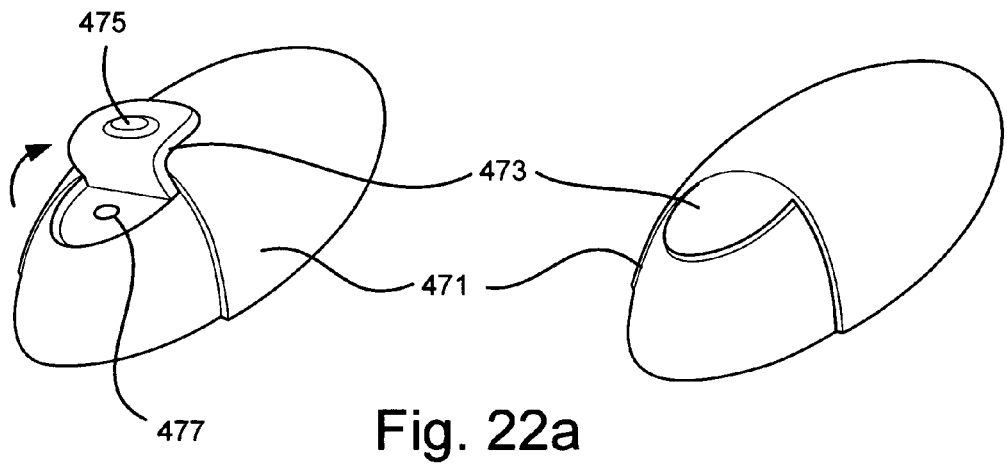
FIG. 22a is a pictorial diagram of a reservoir with a flap closure.
Figure 22B:
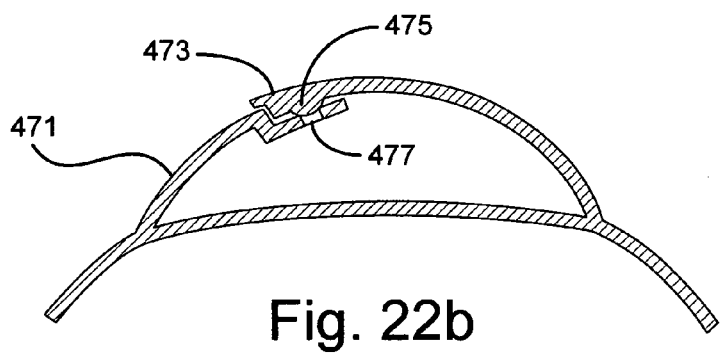
Figure 22C:
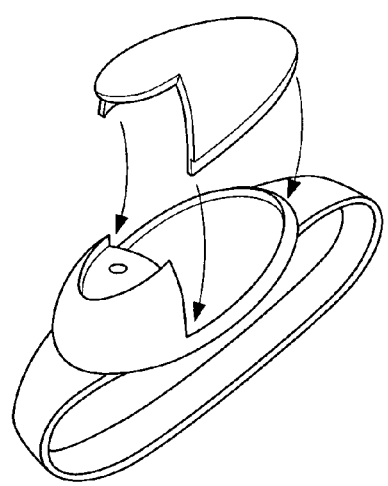

FIG. 22a is pictorial diagram of a reservoir 471 that incorporates a flap 473 to provide closure of a dispensing aperture 477. A shallow nipple 475 on the underside of the flap 473 ensures aperture closure. A cross sectional view of this closure scheme is provided in FIG. 22b. FIG. 22c depicts a method of construction of this reservoir embodiment.

Alternate Wristband Embodiments

Innumerable methods of removable attachment of a self-contained reservoir to a wristband are feasible including use of snap mechanisms, tab inserts, interlocking mechanisms, and even Velcro™. Such removable attachment would facilitate the use of pre-filled, disposable reservoirs or differently shaped or decorated reservoirs.

Figure 23A:
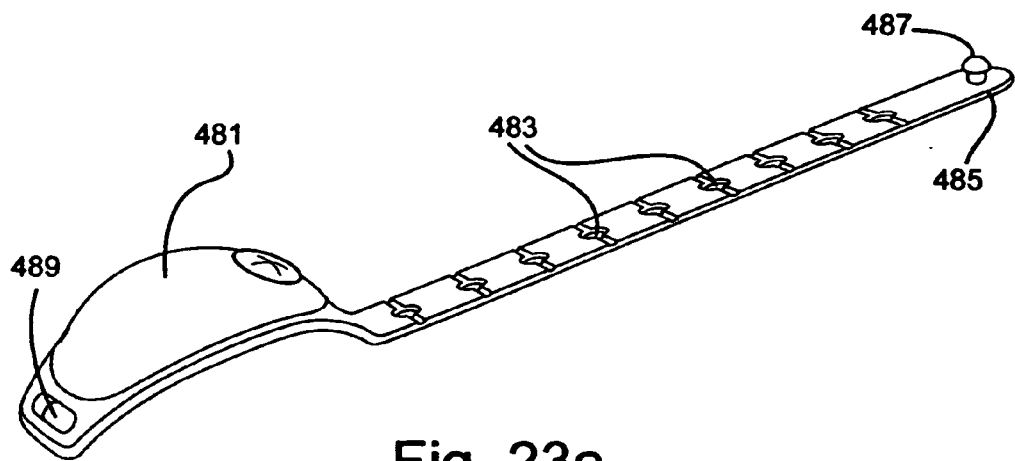
FIG. 23a is a pictorial diagram of a dispenser with wristband having holes that receive a nipple at the end of the wristband for adjustable attachment to the wrist.
Figure 23B:
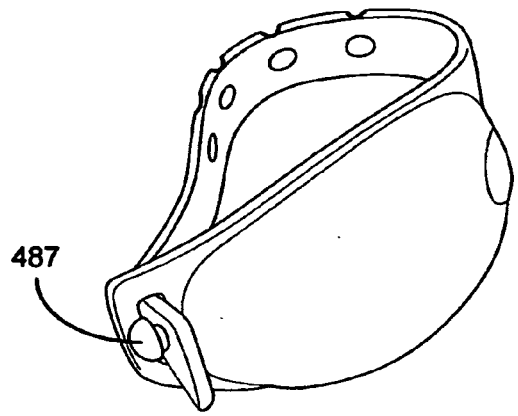
FIG. 23b is a pictorial diagram of the device of FIG. 23a with the end of the wristband having the nipple advanced through a slot in the reservoir.
Figure 23C:
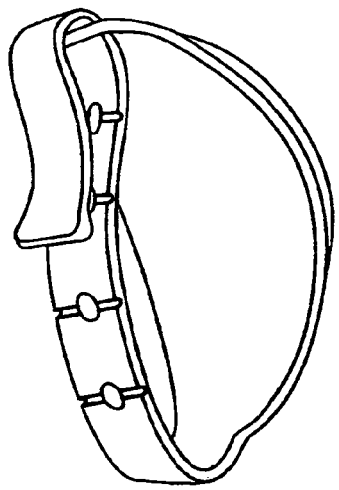
FIG. 23c is a pictorial diagram of the device of FIG. 23a with the nipple pushed through one of the wristband holes.

FIG. 23a is a pictorial diagram of a dispenser 481 having a wristband that exhibits holes 183 much like those in a belt and a nub 487 located at the end of the wristband. Once the end of the wristband strap 485 is threaded through the wristband slit 489 at the other end of the dispenser as shown in FIG. 23b, the nub 487 will be pressed into one of the holes 483 to secure the device to the wrist as shown in FIG. 23c.

Figure 24A:
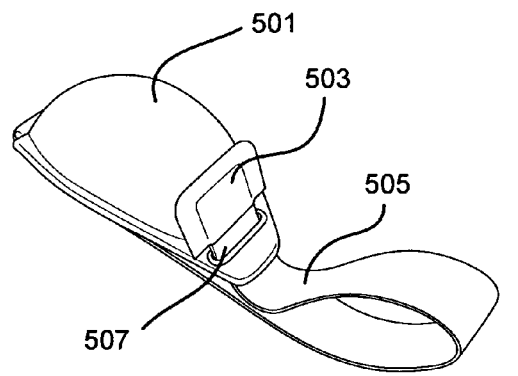
FIG. 24a is a pictorial diagram of a dispenser having a tape wristband with an adhesive backed end.
Figure 24B:
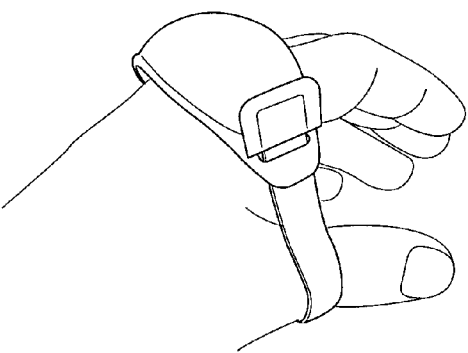
FIG. 24b is a pictorial diagram of the dispenser of FIG. 24a slipped over the hand.
Figure 24C:
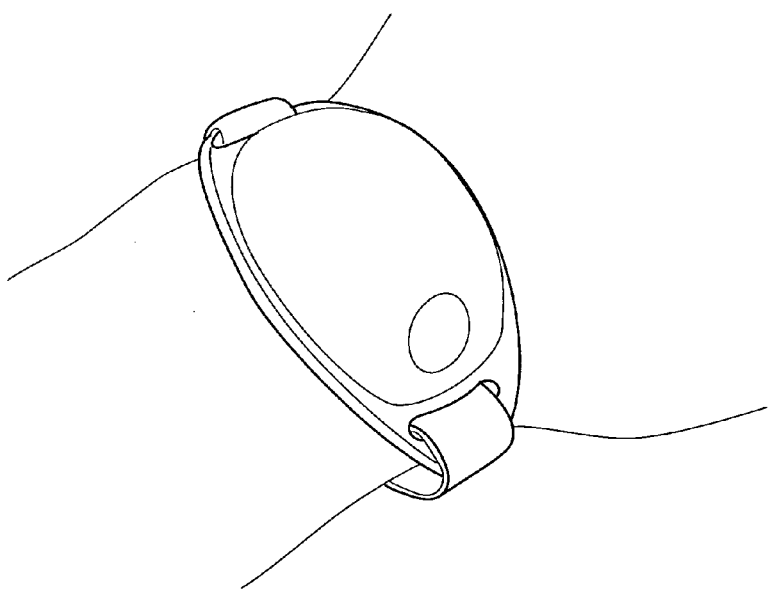
FIG. 24c is a pictorial diagram of the dispenser of FIG. 24a attached to the wrist by adhering the adhesively backed end of the wristband tape to the wristband in a secure fashion.
Figure 25A:
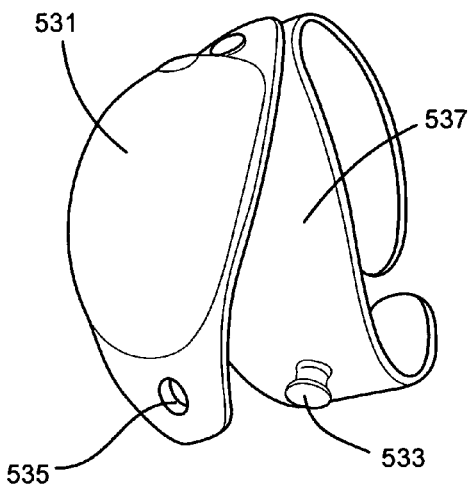
FIG. 25a is a pictorial diagram of a reservoir that is attachable to a semi-rigid, flexible wristband by means of posts molded into the wristband.
Figure 25B:
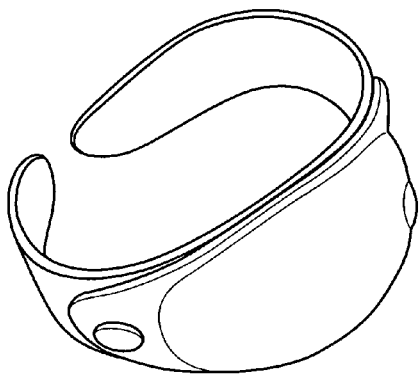
FIG. 25b is a pictorial diagram of the device of FIG. 25a fully assembled.
Figure 25C:
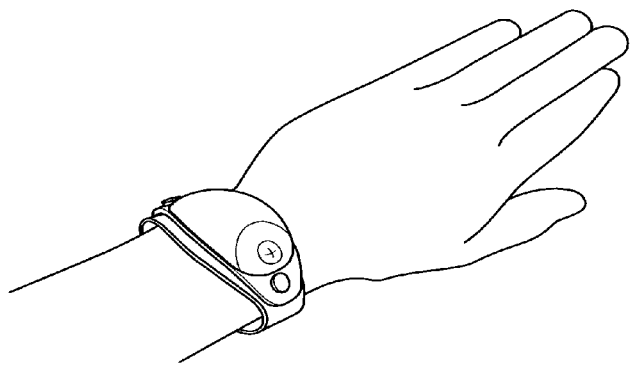
FIG. 25c is a pictorial diagram of the device of FIG. 25a worn on the wrist.
Figure 25D:
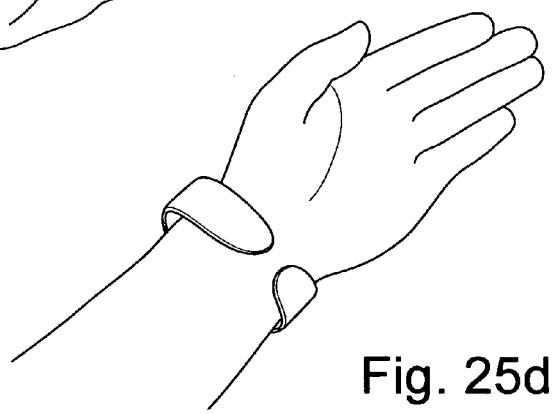
FIG. 25d is a pictorial diagram of the device of FIG. 25a showing the underside of the wristband.

An adhesive-based approach is shown in FIGS. 24a through 24c. A reservoir 501 is shown in FIG. 24a having an attached tape wristband 505 that has the adhesively-backed end 503 of the wristband 505 beyond slot 507 in the dispenser.

This end of the wristband is too large to be pulled back through the slot 507. As shown in FIG. 24b, the device first is slipped over the hand and as in FIG. 24c, the wristband pulled snug about the wrist and the end adhesively adhered to the appropriate location along the wristband.

FIGS. 25a through 25d depict a reservoir 531 that is snap fit to the wristband 537. Holes 535 molded into the reservoir receive the posts 533 molded into the wristband to achieve a snap attachment.

Method of Refill

Figures 26A, 26B:
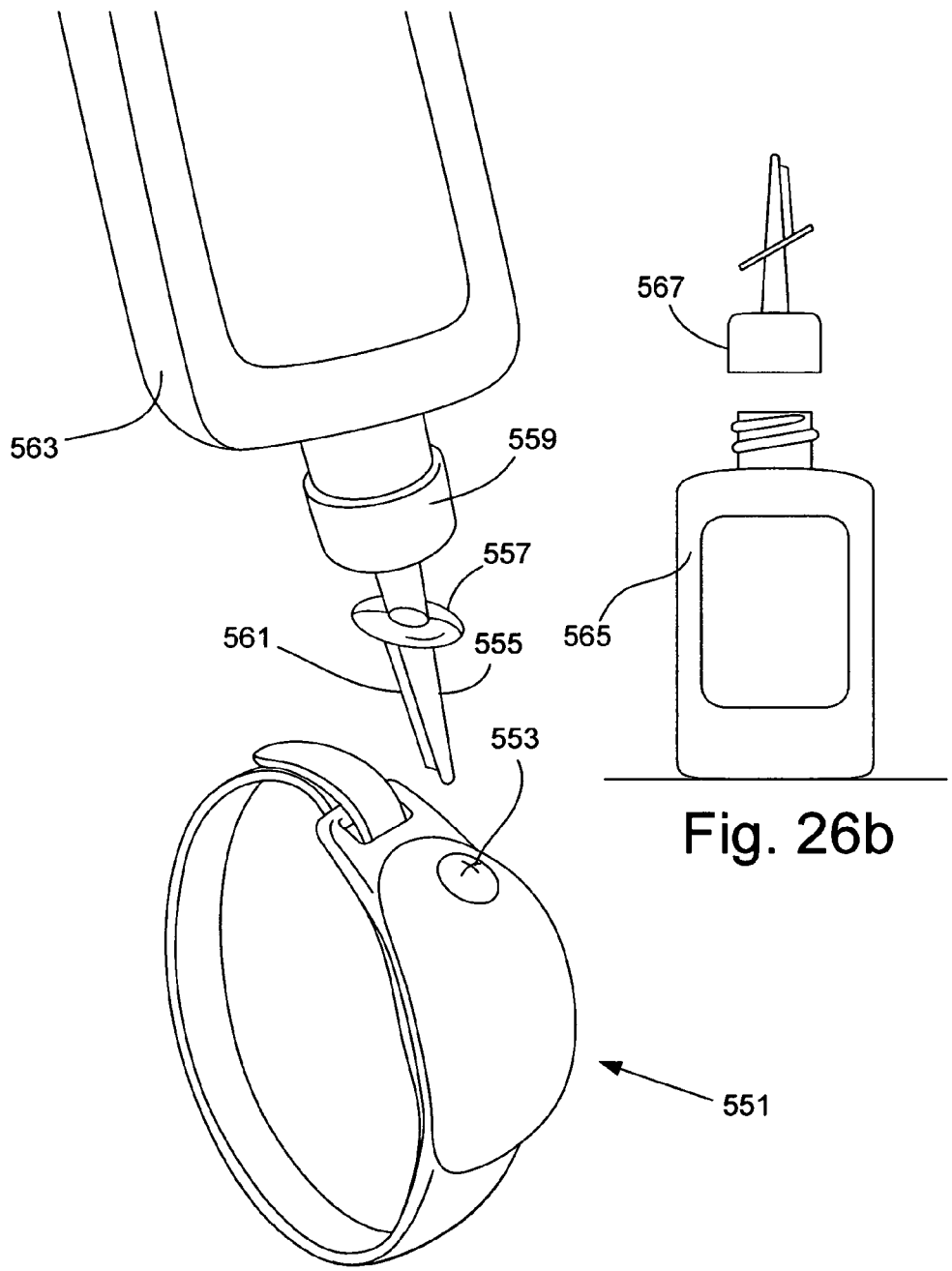
FIG. 26a is a pictorial diagram of a method of reservoir refill.
FIG. 26b is a pictorial diagram of the refill mechanism attachable to standard form factor bottles of hand treatment material.

A means of refilling the wrist-worn, treatment-dispensing devices that uses slit-based diaphragm valves is depicted in FIGS. 26a and 26b. In FIG. 26b, a refill attachment 567 is shown that screws onto to a standard commercially-available bottle 565 of hand sanitizing gel. FIG. 26a depicts the use of this attachment to fill a wrist-worn, treatment dispensing device 551 with slit-based diaphragm valve 553. The attachment comprises a threaded cap portion 559, a tapered nozzle 555, a ridge 561, running from the tip of the nozzle 555 to flange 557. The tip of nozzle 555 is inserted into the dispensing device 551 through slit-based diaphragm valve 553 to an extent where the flange 557 contacts the dispensing device 551. As treatment material from bottle 563 is introduced into dispensing device 551, ridge 561 provides an air escape path by holding the flaps of the slit-based diaphragm valve sufficiently open to permit such air escape from the dispensing device 551. Alternatively, a small tube or air channel could be included along the side of the nozzle for this purpose.

Method of Use

A common method of using the various embodiments of the present invention involves attaching a treatment filled dispensing device to a person. The different attachment schemes disclosed permit attachment to the forearm, wrist, leg, or ankle. One might also consider attachment about the neck or abdomen upon use of a longer attachment band. The device is designed to permit dispensing by a single hand in the following fashion. While attached to a person, the body of the reservoir is seated against an extremity of the body and deformed by pressure from the dispensing hand. This could be achieved by using the fingers, palm, back of the hand, or side of the hand to apply pressure to the device reservoir. Such pressure would result in pressure on the contained treatment fluid sufficient to cause dispensing through the diaphragm valve. Dispensing can be directly onto the actuating hand or onto the valve exterior surface for hand collection by wiping the valve area free of dispensed treatment. It is important for dispensing to be achieved without the need for a person to look at the dispenser. The pronounced geometry of the diaphragm valve surface in certain embodiments of the device facilitates the ability of the user to discern the dispensing location by tactile means. This is addresses both convenience and the prospect for needing to be covert about dispensing in certain social settings. Experience from trial marketing of the invention in hospital and other healthcare settings suggests that the amount of pressure to be applied for the desired dispensing volume is easily learned and repeated. Further, the invention has been viewed as a major convenience when highly mobile personnel require frequent hand sterilization.

SUMMARY

The invention disclosed herein highlights numerous embodiments, but it is understood that changes and variations to these embodiments are anticipated and are within the scope of the invention and the appended claims.

The invention claimed is:

1. A device for dispensing topically applied skin and pharmaceutical treatments comprising:
    a) a dispensing volume enclosed by an elastic reservoir exhibiting a reservoir wall having an interior and an exterior surface,
    b) a slit-based diaphragm valve component exhibiting central slits,
    c) an elastic aperture in said reservoir wall, and
    d) an elastic body extremity attachment comprising elongation or extension of said reservoir wall at substantially opposing positions about said interior to form a band or strap,
    said valve component retained in said aperture to form a fluid seal with said reservoir thereby permitting dispensing exclusively through said valve component slits upon deformation of said elastic reservoir and wherein said slit-based diaphragm valve component further comprises a button exhibiting central slits, said button atop a ring of diameter smaller than said button, said ring atop a flange of diameter larger than said ring, said aperture in said reservoir wall exhibiting a non-deformed diameter smaller than said valve component ring, said valve component retained in said aperture by said flange and said deformable aperture, said flange contiguous with said interior surface of said reservoir wall and said aperture elastically deformed to accommodate the diameter of said valve component ring so as to provide a fluid seal between said aperture and said valve component.

2. A device for dispensing topically applied skin and pharmaceutical treatments as recited in claim 1, wherein said button exhibits an outwardly convex exterior surface.

3. A device for dispensing topically applied skin and pharmaceutical treatments as recited in claim 1, wherein said button exhibits a flat exterior surface.

4. A device for dispensing topically applied skin and pharmaceutical treatments as recited in claim 1, wherein said reservoir is pliable and subject to manual pressure for the dispensing of said treatments from said slit-based diaphragm valve component.

5. A device for dispensing topically applied skin and pharmaceutical treatments as recited in claim 1, wherein said body attachment further comprises a perforated band with a nub at a end of said band, said band receiving said nub at the location of a particular a perforation so as to secure said device to a wrist of a person.

6. A device for dispensing topically applied skin and pharmaceutical treatments as recited in claim 1 wherein said reservoir is manufactured from materials taken from the group comprising silicone rubber, polyisobutylene, and fluoropolymer-coated silicone rubber.

7. A device for dispensing topically applied skin and pharmaceutical treatments as recited in claim 1 wherein said slit-based diaphragm valve exhibits an interior surface which varies to provide a valve thickness that is tapered radially with respect to the axis of said valve in order to promote improved mechanical performance.

\* \* \* \* \*